United States Patent [19]
Erell et al.

[11] Patent Number: 5,148,489
[45] Date of Patent: Sep. 15, 1992

[54] METHOD FOR SPECTRAL ESTIMATION TO IMPROVE NOISE ROBUSTNESS FOR SPEECH RECOGNITION

[75] Inventors: Adoram Erell, Ramat Aviv, Israel; Mitchel Weintraub, Fremont, Calif.

[73] Assignee: SRI International, Menlo Park, Calif.

[21] Appl. No.: 847,875

[22] Filed: Mar. 9, 1992

Related U.S. Application Data

[63] Continuation of Ser. No. 486,462, Feb. 28, 1990, abandoned.

[51] Int. Cl.$^5$ ............................................. G10L 5/00
[52] U.S. Cl. ...................................... 381/47; 381/43
[58] Field of Search ................................ 381/46–48, 381/43; 395/2

[56] References Cited

U.S. PATENT DOCUMENTS

| | | | |
|---|---|---|---|
| 4,587,670 | 5/1986 | Levinson et al. | |
| 4,741,036 | 4/1988 | Bahl et al. | 381/43 |
| 4,783,804 | 11/1988 | Juang et al. | |
| 4,817,156 | 3/1989 | Bahl et al. | 381/43 |

FOREIGN PATENT DOCUMENTS 240330 10/1987 European Pat. Off.

OTHER PUBLICATIONS

Rabiner, "A Tutorial on Hidden Markov Models and Selected Applications in Speech Recognition," *Proc. IEEE*, vol. 77, No. 2, Feb., 1989.

Nadas et al., "Speech Recognition Using Noice-Adaptive Prototypes," *IEEE Trans. on ASSP*, vol. 37, No. 10, Oct., 1989.

Stern et al., "Acoustical Pre-Processor for Robust Speech Recognition," *Proc. DARPA Speech and Natural Language Workshop*, Session, Oct., 1989.

Ephraim et al., "Speech Enhancement Using a Minimum Mean-Square Error Short-Time Spectral Estimator," *IEEE Trans. ASSP.* vol. 32, pp. 1109–1112, (Dec., 1984).

Ephraim et al., "Speech Enhancement Using a Minimum Mean-Square Error Short-Time Spectral Estimator," *IEEE Trans. ASSP*, vol. 33, pp. 443–447 (Apr., 1985).

Porter et al., "Optimal Estimators for Spectral Restoration of Noisy Speech," *Proc. ICASSP*, vol. 2, pp. 18A2.1–2.4 (1984).

Van Compernolle, "Noise Adaptation in a Hidden Markov Model Speech Recognition System," *Computer Speech and Language*, vol. 3, pp. 151–167, 1989.

Van Compernolle, "Spectral Estimation Using a Log-Distance Error Criterion Applied to Speech Recognition," *Proc. ICASSP*, vol. 1, pp. 258–261 (1989).

Gray, "Vector Quantization," *The ASSP Magazine*, vol. 1, No. 2, pp. 3–29 (Apr., 1984).

*Primary Examiner*—Emanuel S. Kemeny
*Attorney, Agent, or Firm*—Townsend and Townsend

[57] ABSTRACT

A method is disclosed for use in preprocessing noisy speech to minimize likelihood of error in estimation for use in a recognizer. The computationally-feasible technique herein called Minimum-Mean-Log-Spectral-Distance (MMLSD) estimation using mixture models and Marlov models, comprises the steps of calculating for each vector of speech in the presence of noise corresponding to a single time frame, an estimate of clean speech, where the basic assumptions of the method of the estimator are that the probability distribution of clean speech can be modeled by a mixture of components each representing a different speech class assuming different frequency channels are uncorrelated within each class and that noise at different frequency channels is uncorrelated. In a further embodiment of the invention, the method comprises the steps of calculating for each sequence of vectors of speech in the presence of noise corresponding to a sequence of time frames, an estimate of clean speech, where the basic assumptions of the method of the estimator are that the probability distribution of clean speech can be modeled by a Markov process assuming different frequency channels are uncorrelated within each state of the Markov process and that noise at different frequency channels is uncorrelated.

15 Claims, 2 Drawing Sheets

METHOD FOR SPECTRAL ESTIMATION TO IMPROVE NOISE ROBUSTNESS FOR SPEECH RECOGNITION

This is a continuation of application Ser. No. 07/486,462, filed Feb. 28, 1990, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention was supported in part by a grant from the National Science Foundation (IRI-8720403) and in part by SRI International of Menlo Park, Calif.

This invention relates to speech recognition in the presence of noise, and more particularly to a method for preprocessing speech for use in connection with a speech recognition system.

Speech recognition systems are very sensitive to differences between a training condition which is free of noise and operating conditions in the presence of noise. In particular, speech recognition systems can be trained to recognize specific speech patterns in the absence of noise and are therefore trained on high-quality speech. However, such systems degrade drastically in noisy environments.

Several methods for handling this problem are known, among them are methods of supplementing the acoustic preprocessing of a speech recognizer with a statistical estimator. A statistical estimator as used herein is intended to provide to a speech recognizer input values or signals which can be assumed to be clean speech information.

The task of designing a statistical estimator for speech recognition is that of defining an optimality criterion that will match the recognizer and of deriving an algorithm to compute the estimator based on this criterion. Defining the optimality criterion is easier for speech recognition than it is for speech enhancement for human listeners, since the signal processing technique is known in the former but not in the latter. For a recognition system which is based on a distance metric, whether for template matching or vector quantization, it is reasonable to assume that the optimality criterion is to minimize the average distortion as measured by that distance metric. Achieving this criterion is frequently computationally infeasible.

With discrete Fourier transform (DFT), filter-bank based systems, the distance measure which is typically used is a weighted Euclidean distance on the cosine transform of the logarithm of the output energy of the filters, often referred to as the "liftered cepstral distance." (The cepstrum in a filter-bank system is defined as a transform of the filter energies.) Achieving this estimation criterion using this distance metric is computationally difficult with additive noise. Published estimation algorithms which have been applied to filter-bank based systems are the minimum mean square error (MMSE) algorithm and the spectral subtraction algorithm, applied to either discrete Fourier transform (DFT) coefficients or filter-bank output energies. (Reference to Porter et al. and Van Compernolle 1 and 2 discussed below.) A basic difference between the multiple-dimensional cepstral distance optimality criterion and the single frequency channel minimum mean square error (MMSE) distance criterion is that the cepstral distance implies a joint estimation of a feature vector whereas the MMSE distance implies an independent estimation of scalar quantities. Because the speech spectral energies at different frequencies are in fact correlated, use of an independent estimate of individual frequency channels results in suboptimal estimation.

This art presumes a basic familiarity with statistics and Markov processes, as well as familiarity with the state of the art in speech recognition systems using hidden Markov models. By way of example of the state of the art, reference is made to the following patents and publications, which have come to the attention of the inventors in connection with the present invention. Not all of these references may be deemed to be relevant prior art.

| Inventor | U.S. Pat. No. | Issue Date |
| --- | --- | --- |
| Bahl et al. | 4,817,156 | 03/28/89 |
| Levinson et al. | 4,587,670 | 05/06/86 |
| Juang et al | 4,783,804 | 11/08/88 |
| Bahl et al. | 4,741,036 | 04/26/88 |
|  | Foreign Pat. No. | Pub. Date |
| Sedgwick et al. | EP 240,330 | 10/07/87 |

Papers

Rabiner, "A Tutorial on Hidden Markov Models and Selected Applications in Speech Recognition," *Proc. IEEE*, Vol. 77, No. 2, February, 1989.

Nadas et al., "Speech Recognition Using noise-adaptive prototypes," *IEEE Trans. on ASSP*, Vol. 37, No. 10, October, 1989.

Stern et al., "Acoustical pre-processor for robust speech recognition," *Proc. DARPA Speech and Natural Language Workshop*, Session, October, 1989.

Ephraim et al., "Speech Enhancement Using a Minimum Mean-Square Error Short-Time Spectral Estimator," *IEEE Trans. ASSP*, Vol. 32, pp. 1109-1112 (December, 1984).

Ephraim et al., "Speech Enhancement Using a Minimum Mean-Square Error Log-Spectral Amplitude Estimator," *IEEE Trans. ASSP*. Vol. 33, pp. 443-447 (April, 1985).

Porter et al., "Optimal Estimators for Spectral Restoration of Noisy Speech," *Proc. ICASSP*, Vol. 2, pp. 18A2.1-2.4 (1984).

Van Compernolle, "Noise Adaptation in a Hidden Markov Model Speech Recognition System," *Computer Speech and Language*, Vol. 3, pp. 151-167, 1989.

Van Compernolle, "Spectral Estimation Using a Log-Distance Error Criterion Applied to Speech Recognition," *Proc. ICASSP*, Vol. 1, pp. 258-261 (1989).

Gray, "Vector Quantization," *The ASSP Magazine*, Vol. 1, No. 2, pp. 3-29 (April, 1984).

The Rabiner paper is a survey article on Hidden Markov Model applications to speech recognition which is background for understanding the present invention. It does not address the noise problem. It is incorporated herein by reference.

The remaining patents and publications describe other work in the general field.

The Nadas et al. paper describes a method that addresses the noise problem. It is not however a preprocessing method.

The Stern et al. paper describes a method that addresses the noise problem using a preprocessor based on spectral subtraction.

The Van Compernolle (1) is a description of a spectral subtraction type of preprocessor.

The Van Compernolle (2) is a description of a preprocessor using Minimum Mean Square Error independent estimation of single channels.

The Porter et al. and Ephraim et al. papers describe preprocessors for use in speech recognition techniques using the minimum mean square error estimation of various functions of the digital Fourier transform (DFT) coefficients, including the logarithm of the DFT amplitude. These techniques deal only with single DFT coefficients.

Sedgwick et al. describes work at the National Resource Development Corporation on a noise compensation apparatus for speech recognition system, wherein input signals corresponding to levels in frequency spectrum regions are derived and the (Euclidean) distance for noisy input cells is determined to take advantage of noise level during both recognition and training. In both recognition and training processes, signals reaching a microphone are digitized and passed through a filter bank to be separated into frequency channels. In training, a noise estimator and a masker are used with a recognizer to prepare and store probability density functions (PDFs) for each channel partially defining Markov models of words to be recognized. The PDFs are derived only from input signals above noise levels, but derivation is such that the whole of each PDF is represented. In recognition, "distance" measurements on which recognition is based are derived for each channel. If the signal in one channel is above the noise level, then the distance is determined by the recognizer from the negative logarithm of the PDF. If a channel signal is below a noise level, then the distance is determined from the negative logarithm of the cumulative distance of the PDF to the noise level. This publication describes a recognition system with noise compensation, but it does not address preprocessing to address the noise problem.

Bahl et al. '156 describes IBM work on apparatus and method for training the statistics of a Markov model speech recognizer to a subsequent speaker. Therein, the invention determines label output probabilities at transitions in the Markov models corresponding to the subsequent speaker where there is sparse training data. This patent does not address the noise problem.

Levinson et al. describes AT&T Bell Labs work on a speech recognizer which includes a plurality of stored constrained hidden Markov model reference templates and a set of stored signals representative of prescribed acoustic features of the plurality of reference patterns. This patent does not address the noise problem.

Juang et al. describes further AT&T Bell Labs work on a hidden Markov model speech recognition arrangement. Markov model speech pattern templates are formed by analyzing identified speech patterns to generate frame sequences of acoustic feature signals. This patent does not address the noise problem.

Bahl et al. '036 describes IBM work in a speech recognition system whereby discrimination between similar sounding uttered words is improved by weighting the probability vector data stored for the Markov model representing the reference word sequence of phones. The weighting vector is derived for each reference word by comparing similar sounding utterances using Viterbi alignment and multivariate analysis which maximizes the differences between correct and incorrect recognition multivariate distributions. This patent does not address the noise problem.

None of the prior art teaches how to approximate the cepstral distance optimality criterion in preprocessing of noisy speech in a speech recognition system in a computationally feasible manner.

SUMMARY OF THE INVENTION

In accordance with the invention, a computationally-feasible method is provided for use in preprocessing noisy speech to minimize likelihood of error in estimation for use in a speech recognizer. The computationally-feasible technique, herein called Minimum-Mean-Log-Spectral-Distance (MMLSD) estimation using mixture models and Markov models, comprises the steps of calculating for each vector of speech in the presence of noise corresponding to a single time frame, an estimate of clean speech, where the basic assumptions of the method of the estimator are that the probability distribution of clean speech can be modeled by a mixture of components each representing a different speech class assuming different frequency channels are uncorrelated within each class and that noise at different frequency channels is uncorrelated. (EQ. 11 and FIG. 2). In a further embodiment of the invention, the method comprises the steps of calculating for each sequence of vectors of speech in the presence of noise corresponding to a sequence of time frames, an estimate of clean speech, where the basic assumptions of the method of the estimator are that the probability distribution of clean speech can be modeled by a Markov process assuming different frequency channels are uncorrelated within each state of the Markov process and that noise at different frequency channels is uncorrelated. (EQ. 21 and FIG. 3)

The invention will be better understood upon reference to the following detailed description, taken in conjunction with the accompanying drawings.

DESCRIPTION OF SPECIFIC EMBODIMENTS

Figure 1:
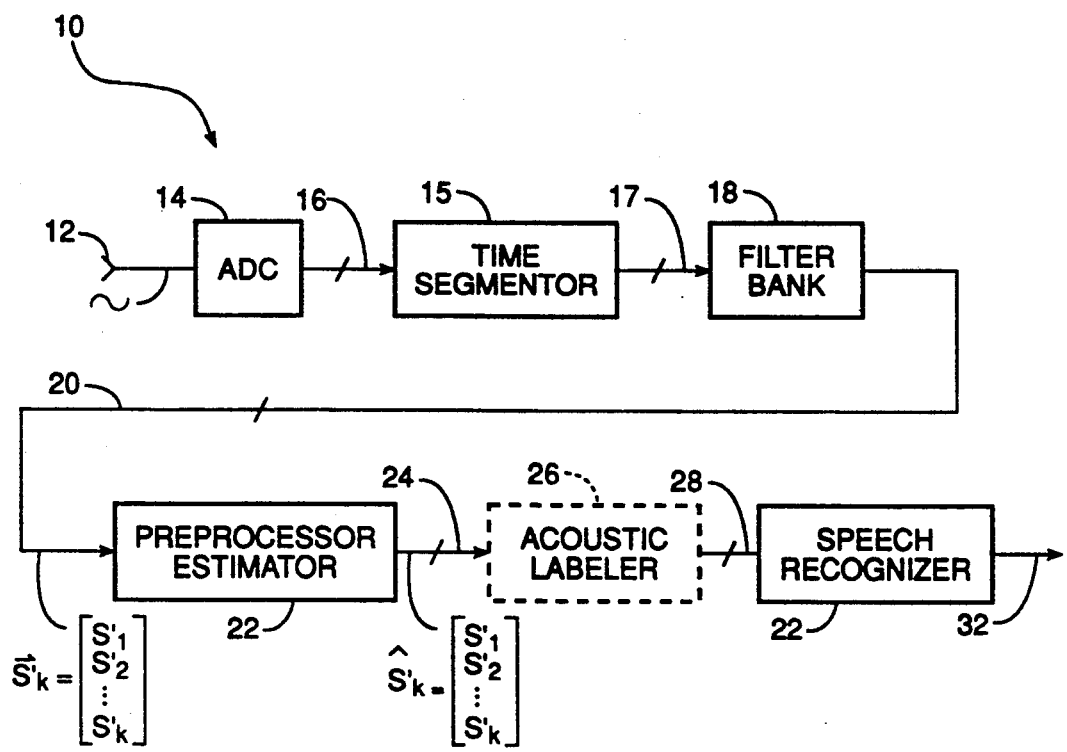
FIG. 1 is a block diagram of a speech recognition system incorporating a preprocessor employing a method in accordance with the invention.

FIG. 1 is a block diagram of a speech recognition system 10 incorporating a preprocessing estimator 22 employing a method in accordance with the invention. The system 10 depicted is a filter-bank-based system employing a hidden Markov process recognizer. Alternatively, a template matching system could be employed for speech recognition. The recognition system 10 receives an analog time-domain signal representing speech in the presence of noise at an input 12, which in turn is applied to a feature extractor comprising an analog to digital converter (ADC) 14 and a filter bank 18. The ADC 14 converts the analog signal to digitized speech which are then applied on digital signal lines 16 to a time segmenter 15. The time segmenter 15 segments the digitized signal into time frames for subsequent processing. Output on lines 17 are applied to a filter bank 18. The filter bank 18 categorizes the speech-+noise (noisy speech) components into a vector of filter log energies (or more generally spectral log energies) S' with components $S'_k$ for each time frame, each component representing one filter channel of speech information. The vector S' is then applied via lines 20 to a preprocessor 22 which functions as an estimator of the clean speech. The output of the preprocessor 22 is in the form of a estimate of clean speech, a vector S.

The vector S is optionally applied on lines 24 to an acoustic labeler 26 or directly to a speech recognizer 30.

The preprocessor 22 functions such that all subsequent processing treats input signals as if no noise is present. Three possible speech recognizers can be used with the preprocessor 22 in accordance with the invention. The speech recognizer 30 may be a discrete density Hidden Markov Model (HMM) recognizer with an acoustic labeler using a distance metric for acoustic labeling. Alternatively, it may use a continuous density HMM recognizer which uses a probabilistic algorithm for acoustic labeling but no distance metric. Still further, the speech recognizer 30 may use template matching, such as dynamic time warping, which uses a distance metric for the template matching. The output of the speech recognizer 30 on lines 32 is the recognized speech.

Figure 2:
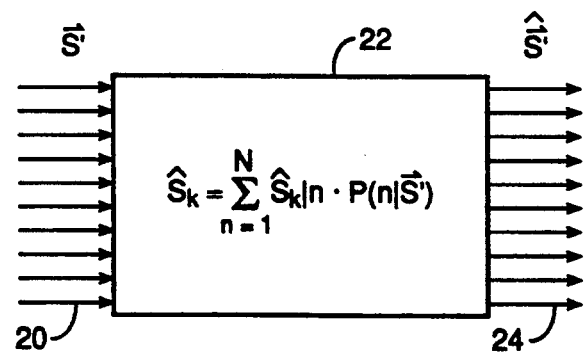
FIG. 2 is a block diagram of a single frame MMLSD estimator using a mixture model according to a first method in accordance with the invention.

Referring now to FIG. 2, there is shown a first embodiment of a preprocessor 22 in accordance with the invention. The preprocessor 22 of FIG. 2 computes an estimate, for each time frame, of the vector of clean speech S from the vector of noisy speech S' based on:

1) the assumption that the probability distribution of clean speech can be modeled by a mixture of components as a mixture model, each component representing a different speech class assuming different frequency channels are uncorrelated within each class, and based on 2) a conditional probability function of a vector of noisy speech around a vector of clean speech which is based on the assumption that noise at different frequency channels is uncorrelated.

The estimator is a minimum mean square error (MMSE) estimation of the vector S, where the mean square error is in the vector Euclidean sense. The minimum Euclidean distance on the vector S of K filter log-energies yields the following vector estimator, (where boldface indicates a vector):

$$S = \int S\, P(S|S')\, dS \quad (1)$$

Using Bayes' Rule, the estimator is therefore of the form:

$$S = \frac{1}{P(S')} \int S P(S'|S) P(S) dS \quad (2)$$

where the probability for the vector S' is given by:

$$P(S') = \int P(S'|S) P(S) dS \quad (3)$$

This estimator is considerably more complex than a single channel-type estimator because it requires integration of K-dimensional probability distributions, e.g., 25 dimensions for 25 frequency channels. In accordance with the invention, approximated models for both the probability of S and the probability of S' around S can be used in the computation, since the assumptions are that the noise is additive and that the vector S is the vector of filter-bank log-energies.

First, the conditional probability of the vector S' around the vector S, or P(S'|S), can be modeled simply as the product of the marginal probabilities, or:

$$P(S'|S) = \prod_{k=1}^{K} P(S'_k|S_k) \quad (4)$$

since it is assumed that Gaussian noise is uncorrelated in the frequency domain and since the energy value of a given noisy filter $S'_k$ depends only on the clean energy $S_k$ and on the noise level at that frequency (i.e., within the passband of the filter at that frequency). This model is merely an approximation, however, where the passbands of the filters overlap.

The conditional probability $P(S'_k|S_k)$ can be modeled as follows:

Assume that the noise associated with the speech to be estimated can be represented by a stationary, ARMA (autoregressive moving average) stochastic process (i.e, viewed as white noise colored by linear filtering). Therefore, at each time frame, the coefficients of the discrete Fourier transform (DFT) for the noise are uncorrelated complex Gaussian random variables. Assume further that the filter output energy can be approximated by a sum of M coefficients. Finally, assume that the noise spectral power is uniform within the range of summation. With only noise present (i.e., no speech), the sum extends over a total of 2M random variables which are Gaussian, of zero mean and of a variance:

$$\sigma^2 = (N_k)/(2M) \quad (5)$$

where $N_k$ is the expected value of the noise filter energy. Under these conditions, the variance-normalized filter energy will obey a chi-squared probability distribution (PD) with 2M degrees of freedom.

In the presence of speech and noise, the filter energy is given by:

$$E_k = \sum_i |DFT_s(i) + DFT_n(i)|^2 \quad (6)$$

where $DFT_s$ refers to speech coefficients and $DFT_n$ refers to noise coefficients.

The random variable given by Equation 6 divided by Equation 5, or $E'_k/\sigma^2$, will then obey a different probability distribution, namely, a probability distribution of noncentral chi-squared with 2M degrees of freedom and noncentral parameter $\lambda$.

Thus the conditional probability of the filter energy is given by:

$$P\left[\frac{E_k}{N_k} \mid \frac{E_k}{N_k}\right] = 2M \cdot \chi^2_{N.C.}\left[\frac{2ME_k}{N_k}, 2M,\lambda\right] \quad (7a)$$

where $$\lambda = \sum_i \frac{|DFT_s(i)|^2}{\sigma^2} = \frac{2ME_k}{N_k}. \quad (7b)$$

With the following normalized log-energy variable defined, $$S_k = 10 \log_{10}\left[\frac{E_k}{N_k}\right]; \; S'_k = 10 \log_{10}\left[\frac{E'_k}{N_k}\right], \quad (8)$$

the conditional probability for $S'_k$ is finally given by $$P(S'_k|S_k) = 0.23 \frac{E_k}{N_k} P\left[\frac{E_k}{N_k} \mid \frac{E'_k}{N_k}\right] \quad (9)$$

The value $S'_k$ is the filter log-energy value of observed speech in the presence of noise for the $k^{th}$ filter, and value $S_k$ is the filter log-energy value of clean speech.

The conditional probability of $S'_k$ around $S_k$ given by Equation 9 provides the needed "fuzziness" in the probability distribution to account for the uncertainty around the speech element S in the presence of noise.

There may be less than 2M degrees of freedom in actual practice due to deviations from the model assumptions. In particular, the filters are typically defined with trapezoidal frequency windows (rather than boxcar or rectangular frequency windows), and the Hamming window of the discrete Fourier transform introduces correlations between the noise DFT coefficients. In addition, the noise spectrum of very broad filters may not be flat within the range of a single filter.

Second, a model is required for the probability distribution (PD) of the clean speech vector P(S). The clean-speech PD cannot be represented in the frequency domain as a product of the marginal probabilities. Rather, this PD can be modeled by a mixture model in the form:

$$P(S) = \sum_{n=1}^{N} C_n P_n(S), \; P_n(S) = \prod_{k=1}^{K} P_n(S_k) \quad (10)$$

where $C_n$ are mixture coefficients, and N is the number of mixture components or classes.

This model is based on the idea that the acoustic space can be divided into classes within which the correlation between different frequency channels is significantly smaller than within the space as a whole. The classes can represent either mutually exclusive or overlapping regions of the acoustic space. As hereinafter explained, the estimator for clean speech is given by:

$$S_k = \sum_{n=1}^{N} S_k|n \cdot P(n|S'), \quad (11)$$

where index n is a class and where the first term (estimate of $S_k$ around n) is the $n^{th}$ class-conditioned MMSE estimator given in a computationally-feasible form by:

$$S_k|n = \frac{1}{P(S'_k|n)} \int S_k P(S'_k|S_k) P_n(S_k) dS_k \quad (12)$$

where $$P(S'_k|n) = \int P(S'_k|S_k) P_n(S_k) \, dS_k \quad (13)$$

and the second term (the a posteriori probability of n given the vector S', i.e., that the clean speech vector belonged to the $n^{th}$ class) is given by:

$$P(n|S') = \frac{C_n P(S'|n)}{\sum_{n=1}^{N} C_n P(S'|n)} \quad (14)$$

where $$P(S'|n) = \prod_{k=1}^{K} P(S'_k|n). \quad (15)$$

Thus the estimator can be viewed as a weighted sum of class-conditioned MMSE estimators. Where N=1, the resulting estimator is identical to an MMSE estimator of individual channels.

In order to realize a computationally-feasible estimator according to the invention, it is necessary to employ a mixture model to model P(S) by equation 10. Several implementation of the mixture model may be employed, depending on the application.

The simplest implementation of the mixture model is by vector quantization. The vector quantization mixture model identifies the classes with rigid-boundary partitions of the acoustic space and creates the partitions by vector quantization. A codebook of size N is created using the Lloyd algorithm. (The Lloyd algorithm is given in the literature in Gray.) The codebook minimizes the distortion as measured by the Euclidean distance, and $P_n(S_k)$ is estimated from a histogram of all speech frames quantized into codeword n.

Another implementation of the mixture model which provides a better fit within computationally-feasible methods is a mixture of Gaussians model. This model is a parametric model for the PDs adjusted so as to maximize the likelihood of observed data given the model.

Figure 3:
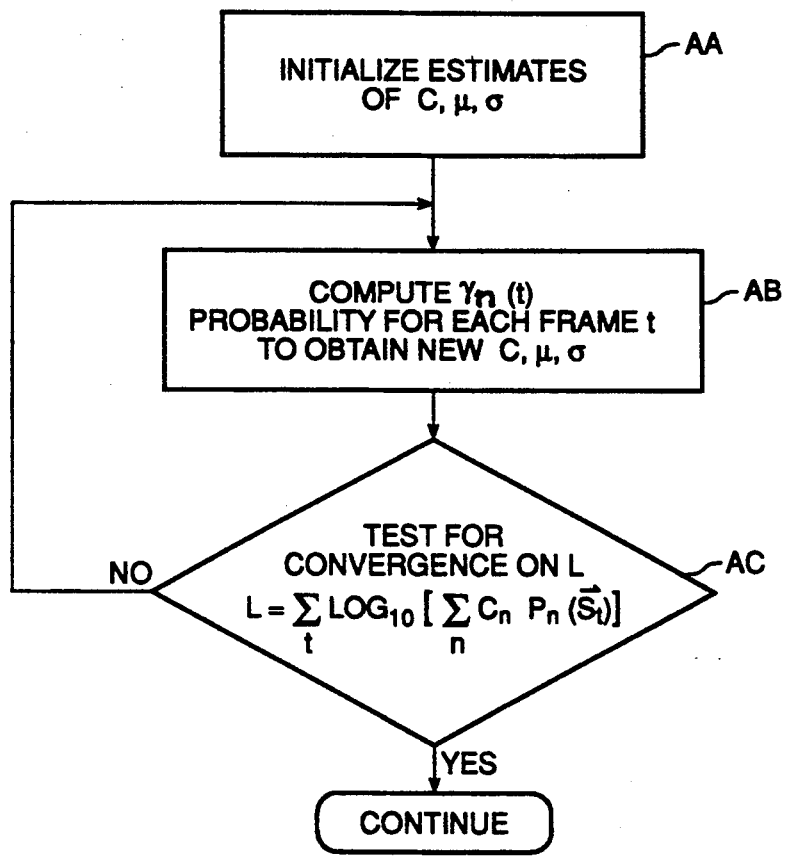
FIG. 3 is a flow chart illustrating a computation of a mixture of Gaussians model used in connection with the invention.

Parameterization with a mixture of Gaussians model begins with the assumptions that the probabilities $P_n(S_k)$ are Gaussian distributions, each with a mean value of $\mu_{nk}$ and a standard deviation $\sigma_{nk}$. The maximum likelihood problem thus becomes a problem of estimating Hidden Markov Model (HMM) parameters with continuous densities, where the model comprises a single state with N multivariate Gaussian components of diagonal covariance matrices. FIG. 3 illustrates steps for parameter estimation using an iterative procedure as follows:

Make initial estimates of C, $\mu$ and $\sigma$ (Step AA). A reasonable starting point for these "seed" values would be the classification by vector quantization using as values the relative numbers of vectors in each class, their mean and their standard deviation.

Next, perform a loop on all speech frames and for each frame "t" compute the probability $\gamma_n(t)$ according to the equations:

$$\gamma_n(t) = \frac{C_n P_n(S_t)}{\sum_n C_n P_n(S_t)} \quad (16)$$

where $P_n(S_t)$ is computed using the current values of $\mu$ and $\sigma$ (Step AB). The new parameter estimates are then given by the following time averages $$C_n = <\gamma_n(t)> \tag{17}$$

$$\mu_{nk} = \gamma_n(t)S_k(t) \tag{18}$$

$$\sigma^2_{nk} = \gamma_n(t)\{S_k(t) - \mu_{nk}\}^2 \tag{19}$$

Finally, test for convergence of the total likelihood given by:

$$L = {}_t\Sigma \log_{10}[\Sigma_n C_n P_n(S_t)] \tag{20}$$

(Step AC). If convergence is not attained, then Step AB is repeated, and the convergence test (Step AC) is repeated until convergence is attained.

The above methods have potential difficulties in practice. First, filter-bank-based systems have filters with passbands that typically overlap, and second, the computational load, even in the foregoing model, may be excessive, particularly for interactive or near real-time recognition systems. With overlapping filters, the assumptions regarding statistical independence of channels are incorrect. While overlapping filters can be replaced with non-overlapping filters, it is also possible to apply a "Broadband" mixture model to reduce the computational load.

With overlapping filters, a K-dimensional vector of filter log-energies can be represented by a vector of less than K dimensions assuming a fewer number of filters with broad yet non-overlapping passbands. Quantization using the VQ mixture model is thereby simplified, and a new, lower-dimensional vector is introduced as a ["]wideband spectral vector [quantization mixture model" as follows:] R, defined as the log energy in a number of frequency bands.

The classification of speech frames proceeds by quantizing the vectors R with a codebook of size N. The mixture components $P_n(S_k)$ of Equation 10 are then estimated based on these classes, and the a posteriori class probability is conditioned on the vector R' rather than on the vector S' as in Equation 11.

$$S_k = \sum_{n=1}^{N} S_k|n \cdot P(n|R') \tag{21}$$

Equation 21 replaces Equation 11 and the a posteriori class probabilities replacing Equations 14 and 15 are given by:

$$P(n|R') = \frac{C_n P(R'|n)}{\sum_{n=1}^{N} C_n P(R'|n)} \tag{22}$$

where $$P(R'|n) = \prod_{j=1}^{J} P(R'_j|n) \tag{23}$$

where j is a broadband channel, $R_j$ is the log-energy in channel j, and the total number of bands is J.

$P(R'_j|n)$ is computed similarly to Equation (13), where $R_j$ and $R'_j$ replace $S_k$ and $S'_k$. $P_n(R_j)$) can be either estimated from histograms of the speech frames quantized into codeword n, using vector quantization or it can be modeled by a Gaussian, similar to Gaussian Mixture modeling. $P(R'_j|R_j)$ can similarly be modeled after $P(S'_k|S_k)$ of Equation 9. The advantage of this method is therefore in the smaller number of integrals to be computed and multiplied in Equation (22), relative to Equation (14).

Figure 4:
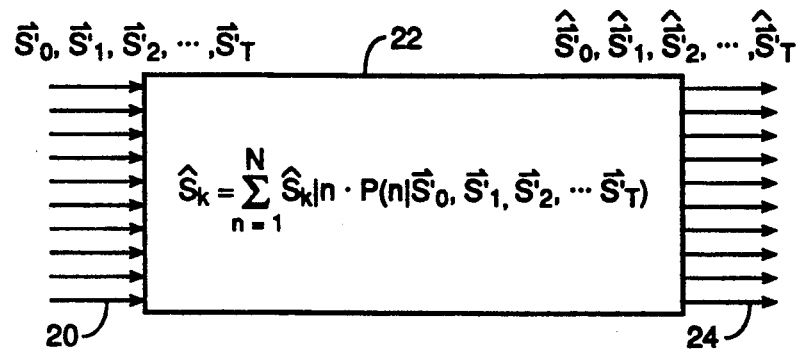
FIG. 4 is a block diagram of a MMLSD estimator for a sequence of time frames using a Markov model according to a second method in accordance with the invention.

Referring now to FIG. 4, there is illustrated a second embodiment of a preprocessor 22 in accordance with the invention. The preprocessor 22 of FIG. 4 computes an estimate, for a sequence of time frames, of the vectors of clean speech, $S_O$ to $S_T$ from the sequence of vectors of noisy speech, $S'_O$ to $S'_T$, based on:

1) the assumption that the probability distribution of clean speech can be modeled by a Markov model, each state of the Markov model representing a different speech class assuming different frequency channels are uncorrelated within each class, and based on 2) a conditional probability function of a vector of noisy speech around a vector of clean speech which is based on the assumption that noise at different frequency channels is uncorrelated.

The estimator is a minimum mean square error (MMSE) estimation of a sequence of vectors $S_O$ to $S_T$, where the mean square error is in the vector Euclidean sense. The minimum Euclidean distance estimator of vector S of K filter log-energies given the sequence of noisy vectors $S'_O$ to $S'_T$, yields the following vector estimator:

$$S_t = \int S_t P(S_t|S'_O, \ldots, S'_t \ldots S'_T) dS_t. \tag{24}$$

This vector estimator is computed using the following assumptions. The speech can be modeled by a Markov process so that the speech at any time t is in any one of N different states. The output probability distribution (PD) for state "n" is given by:

$$P_n(S) = \prod_{k=1}^{K} P_n(S_k). \tag{25}$$

The state output probability distributions and the transition probabilities between states are computed by identifying the states with partitions of the acoustic space. These partitions are exactly the same as those used in the vector quantization mixture model or the wideband vector quantization mixture model hereinabove. The transition probabilities are estimated from speech data by counting the number of transitions from one state to another.

With additive noise, the noisy speech is modeled by a Hidden Markov Model (HMM) where the states correspond to the states of the clean speech, and the output probability distributions are given by:

$$P(S'|n) = \prod_{k=1}^{K} P(S'_k|n). \tag{26}$$

where $P(S'_k|n)$ is given by $$P(S'_k|n) = \int P(S'_k|S_k) P_n(S_k) dS_k \tag{27}$$

and where $P_n(S_k)$ is the output probability distribution of the $k^{th}$ component of the clean speech vector S for state "n". The probability of $S'_k$ given $S_k$ is computed using equations 7-9 hereinabove.

Given all of these assumptions, the estimator of FIG. 4 is given by:

$$S_k = {}_n\Sigma S_k | n \cdot P(n|S'_0, \ldots, S'_t \ldots S'_T). \qquad (28)$$

The probability of state "n" given the sequence of noisy speech vectors in Equation 28 is computed by the forward-backward algorithm applied to the HMM of the noisy speech defined above. (The forward-backward algorithm is for example given in the Rabiner A sample of one implementation of the six different preprocessor estimators in accordance with the present invention is presented in Appendix A attached hereto. The appendix is source code written in the LISP programming language.

The invention has now been described with reference to specific embodiments. Other embodiments will be apparent to those of ordinary skill in the art. It is therefore not intended that this invention be limited, except as indicated in the appended claims.

```
;;; **************************************************************
;;;                 The DECIPHER Speech Recognition System
;;;
;;;     Unpublished-rights reserved under the copyright laws of the United States.
;;;
;;;     This data and information is proprietary to, and a valuable trade
;;;     secret of, SRI International. It is given in confidence by SRI
;;;     International. Its use, duplication, or disclosure is subject to the
;;;     restrictions set forth in the License Agreement under which it has
;;;     been distributed.
;;;
;;; **************************************************************
;;;
;;;                 Unpublished Copyright (c) 1990, SRI International
;;;
;;; **************************************************************
;;;-*- Mode: LISP; Package: HMM; Syntax: Zetalisp; Base: 10.;  -*-

;; xxxxxxxxxxxxxxxxxxxxxxxxxxxxxxxxxxxxxxxxxxxxxxxxxxxxxxxxxxxxx
;;
;; This file computes and loads the table: *conditioned-probability-table*
;; which stores P(Sk'|Sk)
;;
;; xxxxxxxxxxxxxxxxxxxxxxxxxxxxxxxxxxxxxxxxxxxxxxxxxxxxxxxxxxxxx ;table for computation of the v1, v100 etc estimation tables
;for Mitch: P(Sk'|Sk)
(defvar *CONDITIONED-PROBABILITY-TABLE*)
(load    "ruby:>adoram>default-filters-conditioned-probability-table.bin")

;This is M
(defvar *NUM-DFT-COEFF-FOR-FILTER* )

(defvar *num-degrees-freedom-array* (fillarray (make-array *num-mel-filters*)
 '(7. 8. 8. 7. 7. 8. 8. 8. 8. 9. 11. 12. 14. 17. 18. 20. 23. 25. 25. 29. 29. 32. 34. 37. 34.)
))

;; xxxxxxxxxxxxxxxxxxxxxxxxxxxxxxxxxxxxxxxxxxxxxxxxxxxxxxxxxxxxx
;;
;; GAMMA FUNCTION CODE:
;;
;; FAST-LOG-GAMMA-FUNCTION-FOR-HALF-INTEGERS (two-times-variable)
;;
;; xxxxxxxxxxxxxxxxxxxxxxxxxxxxxxxxxxxxxxxxxxxxxxxxxxxxxxxxxxxxx (defconst *LOG-GAMMA-OF-ONE-HALF* (log 1.772453850905516d0))

;; single precision function used for runtime computation
;;
(defun LOG-GAMMA-FUNCTION-FOR-HALF-INTEGERS (two-times-variable)
  (let* ((x (* 0.5 two-times-variable)))
    (cond ((= x 1) 0.0)
          ((= x .5) 0.5723649)
          (t
           (loop while () x 1.0)
                 with gamma = (if (= x (fix x))
                                  0.0
                                  0.5723649)
                 finally (return gamma)
                 do
                 (setq gamma (+ gamma (log (1- x))))
                 (decf x 1))))
    ))

;; function used to set up the gamma array for half integers
```

```
;;
(defun SETUP-LOG-GAMMA-FUNCTION-FOR-HALF-INTEGERS (max-two-times-variable &key (single-precision T))
  (let* ((log-gamma-array (make-array (1+ max-two-times-variable)))
        )
    (loop for two-times-variable from 0 to max-two-times-variable
          for x = (* 0.5 two-times-variable)
          for double-gamma-value = (cond ((* x 1)  0.0d0)
                                         ((* x .5) *log-gamma-of-one-half*)
                                         (t
                                          (loop while (> x 1.0)
                                                with gamma = (if (* x (fix x)) 0.0
                                                                 *log-gamma-of-one-half*)
                                                finally (return gamma)
                                                do
                                                (setq gamma (+ gamma (log (- x 1.0d0))))
                                                (decf x 1.0d0))))
          for gamma-value = (if single-precision
                                (float double-gamma-value)
                                double-gamma-value)
          do
          (setf (aref log-gamma-array two-times-variable) gamma-value)
          )
    log-gamma-array
    ))

;; the array that holds the gamma tables for integers
;;
(defvar *MAX-LOG-GAMMA-ARRAY-INDEX* 2000)
(defvar *FAST-LOG-GAMMA-FUNCTION-FOR-HALF-INTEGERS-ARRAY*)
(load "otis:>hmm>v1>fast-log-gamma-function-for-half-integers-array")

#|
;;
;; to save the table to file, the following code was run
;;
(setq *max-log-gamma-array-index* 2000)
(setq *fast-log-gamma-function-for-half-integers-array*
      (setup-log-gamma-function-for-half-integers *max-log-gamma-array-index* :single-precision t))
(sys:dump-forms-to-file "otis:>hmm>v1>fast-log-gamma-function-for-half-integers-array"
                        (list '(setq hmm:*fast-log-gamma-function-for-half-integers-array*
                                     ',hmm:*fast-log-gamma-function-for-half-integers-array*))
                        '(:package "hmm"))
|#

;; fast: aref if it is there, else, compute the value on the fly
;;
(defun FAST-LOG-GAMMA-FUNCTION-FOR-HALF-INTEGERS (two-times-variable)
  (if (<= two-times-variable *max-log-gamma-array-index*)
      (aref *fast-log-gamma-function-for-half-integers-array* two-times-variable)
      (log-gamma-function-for-half-integers two-times-variable)
      ))

;; xxxxxxxxxxxxxxxxxxxxxxxxxxxxxxxxxxxxxxxxxxxxxxxxxxxxxxxxxxxxxxxx
;;
;; CHI SQUARED DISTRIBUTION
;;
;; xxxxxxxxxxxxxxxxxxxxxxxxxxxxxxxxxxxxxxxxxxxxxxxxxxxxxxxxxxxxxxxx (defun LOG-CHI-SQUARE-PDF (variable
                           &optional
                           (num-degrees-of-freedom 2)
                           )
  (without-floating-underflow-traps
    (cond ((<= variable 0.0) -1e=)
          (T
;          (if (and (zerop variable) (= num-degrees-of-freedom 2))
;              -0.6931472
           (- (+ (* 0.6931472 (- (* 0.5 num-degrees-of-freedom)))
                 (* (log variable) (- (* 0.5 num-degrees-of-freedom) 1))
                 (- (* 0.5 variable))
                 )
              (fast-log-gamma-function-for-half-integers num-degrees-of-freedom))))))

(defun NONCENTRAL-CHI-SQUARE-PDF (variable noncentral-parameter num-degrees-of-freedom)
  (without-floating-underflow-traps
    (let* ((approx-mean (+ noncentral-parameter num-degrees-of-freedom))
           (approx-sigma (sqrt (+ (* 2 num-degrees-of-freedom) (* 4 noncentral-parameter))))
           (num-sigma-range 5)
           )
      (cond
;       when gaussian approximation was used
        ((> num-degrees-of-freedom 50)
         (fast-gaussian-probability-of-data-point variable approx-mean approx-sigma)
         )
        (T
```

```
          (if (or (< variable (- approx-mean (* num-sigma-range approx-sigma)))
                 (> variable (+ approx-mean (* num-sigma-range approx-sigma))))
              0.0
              (loop for j from 0 below (+ noncentral-parameter num-degrees-of-freedom)
                    with lamda = (* noncentral-parameter 0.5)
                    with negative-lamda = (* -1.0 lamda)
                    with log-lamda = (if (= lamda 0.0) -1e= (log lamda))
                    with log-factor = 0.0
                    for non-central-degrees-of-freedom = (+ num-degrees-of-freedom (* 2 j))
                    for log-chi-square = (log-chi-square-pdf variable non-central-degrees-of-freedom)
                    sum (exp (+ log-chi-square log-factor negative-lamda)) into accumulated-sum
                    finally (return (float accumulated-sum))
                    do
                 (setq log-factor (+ log-factor (- log-lamda (log (+ j 1.0)))))
                 )
              ))))))

(defun approximate-noncentral-chi-square-pdf (variable noncentral-parameter num-degrees-of-freedom)
  (let* ((approx-mean (+ noncentral-parameter num-degrees-of-freedom))
         (approx-sigma (sqrt (+ (* 2 num-degrees-of-freedom) (* 4 noncentral-parameter))))
         )
    (fast-gaussian-probability-of-data-point variable approx-mean approx-sigma)))

;compute M
;
(defun WEIGHTED-NUMBER-DFT-COEFF-IN-FILTER ()
  (let* ((sum-weights-array (make-array *num-mel-filters*))
         )
    (loop for i from 0 below *num-mel-filters*
          with offset = 0
          for num-dft-coeff = (aref *mel-filt-control-array* (+ 1 (* 2 i)))
          for sum-weights = 0
          do
       (loop for j from 0 below num-dft-coeff
             for weight = (aref *mel-filt-coeff-array* (+ j offset))
             do
          (incf sum-weights weight))
       (setf (aref sum-weights-array i) sum-weights)
       (incf offset num-dft-coeff)
       )
    sum-weights-array))

(defun DFT-WEIGHTS-FOR-FILTER (filter-index)
  (let* ((dft-weight-array (array-clear (make-array 256)))
         (offset (loop for i from 0 below filter-index
                       with offset = 0
                       for num-dft-coeff = (aref *mel-filt-control-array* (+ 1 (* 2 i)))
                       finally (return offset)
                                 do (incf offset num-dft-coeff)))
         (starting-dft-index (aref *mel-filt-control-array* (* 2 filter-index)))
         (num-dft-coeff (aref *mel-filt-control-array* (+ 1 (* 2 filter-index))))
         )
    (loop for j from 0 below num-dft-coeff
          for dft-index from starting-dft-index
          for weight = (aref *mel-filt-coeff-array* (+ j offset))
          do
       (setf (aref dft-weight-array dft-index) weight))
    dft-weight-array))

;set M
;
(setq *num-dft-coeff-for-filter* (weighted-number-dft-coeff-in-filter))

; Here it is!!! P(Sk'|Sk)
;
(defun PROBABILITY-LOG-NOISY-FILTER-ENERGY-GIVEN-CLEAN (noisy-log-energy clean-log-energy filter-index
                                                        &optional (scale-degrees-freedom 0.66))
  (without-floating-underflow-traps
   (let* ((num-degrees-freedom (fixr (* 2 scale-degrees-freedom (aref *num-dft-coeff-for-filter* filter-index))))
          (normalized-clean-energy (* num-degrees-freedom (db-to-power clean-log-energy)))
          (normalized-noisy-energy (* num-degrees-freedom (db-to-power noisy-log-energy)))
          )
     (* 0.23026 normalized-noisy-energy (noncentral-chi-square-pdf normalized-noisy-energy
                                                                  normalized-clean-energy
                                                                  num-degrees-freedom))
     )))

(defun new-PROBABILITY-LOG-NOISY-FILTER-ENERGY-GIVEN-CLEAN (noisy-log-energy clean-log-energy filter-index)
  (without-floating-underflow-traps
   (let* ((num-degrees-freedom (aref *num-degrees-freedom-array* filter-index))
          (normalized-clean-energy (* num-degrees-freedom (db-to-power clean-log-energy)))
          (normalized-noisy-energy (* num-degrees-freedom (db-to-power noisy-log-energy)))
          )
```

```
         (* 0.23026  normalized-noisy-energy (noncentral-chi-square-pdf normalized-noisy-energy
                                                                        normalized-clean-energy
                                                                        num-degrees-freedom))
       )))

(defun probability-log-noise-filter-energy (noise-log-energy num-degrees-freedom)

(without-floating-underflow-traps
   (let* ((normalized-noise-energy (* num-degrees-freedom (db-to-power noise-log-energy)))
          )
     (* 0.23026  normalized-noise-energy (exp (log-chi-square-pdf normalized-noise-energy
                                                                 num-degrees-freedom)))
     )))

;Creates the table hmm:*conditioned-probability-table*
;
(defun MAKE-CONDITIONED-PROBABILITY-TABLE
       (&key
        (minimum-clean           -100)
        (maximum-clean            70)
        (delta-clean             1.0)
        (min-noisy               -10)
        (delta-noisy             1.0)
        (num-noisy-energy-entries 25)

(num-filters             *num-mel-filters*)
        (save-table-in-filename  NIL)
        )
  (let* ((num-clean-bins (fixr (// (- maximum-clean minimum-clean) delta-clean)))
         (output NIL)
         (conditioned-prob-array (make-array (list num-filters num-noisy-energy-entries num-clean-bins)))
         )
    (loop for filter-index from 0 below num-filters do
      (loop for noisy-index from 0 below num-noisy-energy-entries
            for normalized-noisy-log-energy = (+ min-noisy (* delta-noisy noisy-index))
            do
         (loop for clean-speech-index from 0 below num-clean-bins
               for clean-speech from minimum-clean by delta-clean
               do (setf (aref conditioned-prob-array filter-index noisy-index clean-speech-index)
                        (probability-log-noisy-filter-energy-given-clean
                           normalized-noisy-log-energy
                           clean-speech
                           filter-index)))
         ))
    (setq output (list minimum-clean delta-clean conditioned-prob-array))

;    ;; the following should be run after the oddities of the conditioned-probability
;    ;; have been determined. Thus it is commented out from here and should be run by
;    ;; hand.
;    (massage-conditioned-probability-table output :min-noisy min-noisy :delta-noisy delta-noisy)

;; used to be stored in "ruby:>adoram>conditioned-probability-table.bin"

(if save-table-in-filename
        (sys:dump-forms-to-file save-table-in-filename
                                (list '(setq hmm:*conditioned-probability-table* ',output))
                                '(:package "hmm")))
    output))

(defun histogram-filterbank-energy-for-0-db-white (num-samples)
  (let* ((waveform
          (fill-array-with-gaussian-random-variables
             (get-noisy-speech-blank-waveform-array num-samples)
             :standard-deviation 1000 :quantize-p T))
         (energy-list (filterbank-from-waveform-array waveform))
         (filter-log-energy-2d-array (seventh energy-list))
         (filter-energy-2d-array (sixth energy-list))
         (num-frames (array-dimension-n 1 filter-log-energy-2d-array))
         (array-of-histograms (make-array *num-mel-filters*))
         (temp-filter-log-energy-array (make-array num-frames))
         )
    (loop for filter from 0 below *num-mel-filters*
          for noise-average-energy = (power-to-db (mean-of-2d-array filter-energy-2d-array filter))
          do
      (loop for i from 0 below num-frames do
        (setf (aref temp-filter-log-energy-array i)(aref filter-log-energy-2d-array i filter))
        )

(array-constant-subtract temp-filter-log-energy-array noise-average-energy temp-filter-log-energy-array)
      (setf (aref array-of-histograms filter)
            (histogram-array-by-linear-quantization temp-filter-log-energy-array :num-bins 50)
            )
      )
    array-of-histograms
    ))
```

```
(defun fit-prob-noise-filterbank-to-histogram (te-histogram ndof)
  (let* ((num-bins        (histogram-num-bins te-histogram))
         (histogram-array (histogram-array    te-histogram))
         (fit-array       (make-array num-bins))
         (chi-square 0)
         )
    (loop for noisy-index from 0 below num-bins
          for noisy-db = (translate-histogram-bin-index-center-to-variable-value noisy-index te-histogram)
          do
      (setf (aref fit-array noisy-index)
            (probability-log-noise-filter-energy noisy-db ndof)
            )
      )
    (array-normalize-sum fit-array fit-array)
    (array-constant-multiply fit-array (array-sum histogram-array) fit-array)
    (setq chi-square
          (loop for noisy-index from 0 below num-bins
                for speech-value   = (aref histogram-array noisy-index)
                for noisy-fit-value = (aref fit-array     noisy-index)
                for diff-value     = (- speech-value noisy-fit-value)
                for sum-value      = (// (* diff-value diff-value) (max 1 speech-value))
                sum sum-value into the-sum
                finally (return (// the-sum num-bins))))
          )
    (values (list histogram-array fit-array) chi-square)
    ))

;(defun TEST-STATISTICS-OF-NOISY-FILTERBANK (adc-file
;                                            signal-to-noise-ratio-in-db
;                                            num-repetitions
;                                            &optional (num-samples-in-waveform NIL)
;                                            )
;  (let* ((waveform (if (not num-samples-in-waveform) (read-waveform-from-adc-file adc-file :temp-array-p T)
;                       (fps:make-fix-array num-samples-in-waveform :displaced-to
;                                           (read-waveform-from-adc-file adc-file :temp-array-p T))))
;         (waveform-energy (array-variance waveform))
;         (noise-power-in-db (- (power-to-db waveform-energy) signal-to-noise-ratio-in-db))
;         (list-clean-fps-results (filterbank-from-waveform-array waveform))
;         (log-filter-energy-2d-array (seventh list-clean-fps-results))
;         (num-filters (fifth list-clean-fps-results))
;         (num-frames (fourth list-clean-fps-results))
;         (clean-filter-log-energy-2d-array
;           (copy-array log-filter-energy-2d-array (fps:make-float-array (list num-frames num-filters))))
;         (mean-noise-log-energy (make-array num-filters))
;         (output-array (make-array (list num-frames num-filters)))
;         )
;    (loop for filter-number from 0 below num-filters
;          do
;      (setf (aref mean-noise-log-energy filter-number)
;            (+ noise-power-in-db (nth filter-number *filter-log-energy-for-0-db-white-noise*)))
;      (loop for frame from 0 below num-frames
;            do
;        (setf (aref output-array frame filter-number ) (make-array num-repetitions))
;        )
;      )
;    (loop for i from 0 below num-repetitions
;          for noisy-waveform = (add-gaussian-random-noise-to-speech-waveform waveform signal-to-noise-ratio-in-db
;                                                                             :temp-array-p T)
;          for list-fps-results = (filterbank-from-waveform-array noisy-waveform)
;          for noisy-log-filter-energy-2d-array = (seventh list-fps-results)
;          do
;      (loop for filter-number from 0 below num-filters
;            do
;        (loop for frame from 0 below num-frames
;              do
;          (setf  (aref (aref output-array frame filter-number ) i) (aref noisy-log-filter-energy-2d-array frame filter-number))

;          )))
;    (sys:dump-forms-to-file "ruby:>adoram>filterbank-noisy-statistics.bin"
;                            (list '(setq hmm:*filterbank-noisy-statistics*',
;                                         (list clean-filter-log-energy-2d-array mean-noise-log-energy output-array)))
;                            '(:package "hmm"))
;    (list clean-filter-log-energy-2d-array mean-noise-log-energy output-array)
;    ))

;(defun make-array-probability-filterbank-log-energy-given-clean (clean
;                                                                 base
;                                                                 bin-size
;                                                                 filter-index
;                                                                 &key
;                                                                 (num-bins 100)
;                                                                 (array NIL)
;                                                                 (noise 0)
;                                                                 (scale-num-dfts 0.66)
;                                                                 )
;  (let* ((prob-array (if (not array) (make-array num-bins)
;                         array))
;         (normalized-clean (- clean noise))
;         )
```

```
;      (loop for i from 0 below (array-length prob-array)
;            for noisy from base by bin-size
;            for normalized-noisy = (- noisy noise)
;            do
;        (setf (aref prob-array i)
;              (probability-log-noisy-filter-energy-given-clean
;                normalized-noisy normalized-clean filter-index scale))
;        )
;      prob-array))

;(defun plot-conditioned-filterbank-probability-as-function-of-clean (noisy
;                                                                    base
;                                                                    bin-size
;                                                                    filter-index
;                                                                    &key
;                                                                    (num-bins 100)
;                                                                    (array NIL)
;                                                                    (noise 0)
;                                                                    )
;  (let* ((prob-array (if (not array) (make-array num-bins)
;                         array))
;         (normalized-noisy (- noisy noise))
;         )
;
;      (loop for i from 0 below (array-length prob-array)
;            for clean from base by bin-size
;            for normalized-clean = (- clean noise)
;            do
;        (setf (aref prob-array i)
;              (probability-log-noisy-filter-energy-given-clean
;                normalized-noisy normalized-clean filter-index))
;        )
;      prob-array))

;;For the Van Compernolle approx (vluvc)
;;
;(defun simplified-probability-log-noisy-filter-energy-given-clean (noisy-log-energy clean-log-energy filter-index
;                                                                   &optional (scale-degrees-freedom 0.66))
;  (without-floating-underflow-traps
;    (let* ((num-degrees-freedom (fixr (* 2 scale-degrees-freedom (aref *num-dft-coeff-for-filter* filter-index))))
;           (normalized-clean-energy (* num-degrees-freedom (db-to-power clean-log-energy)))
;           (normalized-noisy-energy (* num-degrees-freedom (db-to-power noisy-log-energy)))
;           )
;      (* 0.23 normalized-noisy-energy (chi-square-pdf (- normalized-noisy-energy
;                                                         normalized-clean-energy)
;                                                      num-degrees-freedom))
;      )))

;(defun fast-probability-log-noisy-filter-energy-given-clean (noisy-log-energy
;                                                             clean-log-energy
;                                                             filter-index
;                                                             &optional
;                                                             (table-list *table-fast-probability-noisy-filter-given-clean*)
;                                                             (offset-table NIL)
;                                                             )
;  (let* ((table (third table-list))
;         (num-clean-levels (array-dimension-n 2 table))
;         (num-diff-levels  (array-dimension-n 1 table))
;         (min-clean (first (first table-list)))
;         (delta-clean (second (first table-list)))
;         (clean-index (max 0 (fixr (// (- clean-log-energy min-clean) delta-clean))))
;         (clipped-clean-index (min clean-index (1- num-clean-levels)))
;         (min-diff (first (aref (second table-list) clipped-clean-index filter-index)))
;         (delta-diff (second (aref (second table-list) clipped-clean-index filter-index)))
;         (mean (power-to-db (+ 1 (db-to-power clean-log-energy))))
;         (offset (if (not offset-table) 0
;                     (aref (aref offset-table filter-index) clipped-clean-index)))
;         (diff (- (+ noisy-log-energy offset) mean))
;         (norm-diff (// (- diff min-diff) delta-diff))
;         (lower-diff-index (fix norm-diff))
;         )
;    (if (< clean-index num-clean-levels)
;        (if (and (>= lower-diff-index 0) (< lower-diff-index (1- num-diff-levels)))
;            (linear-interpolation lower-diff-index (aref table lower-diff-index clean-index filter-index)
;                                  (+ 1 lower-diff-index) (aref table (+ 1 lower-diff-index) clean-index filter-index)
;                                  norm-diff)
;          0)
;      (probability-log-noisy-filter-energy-given-clean noisy-log-energy clean-log-energy filter-index)
;      )
;    ))

;(defun prob-noisy-filterbank-given-clean-as-a-function-of-clean
;       (noisy-filter-log-energy
;        clean-filter-log-energy
;        filter-index
;        &optional
;        (table-list *table-fast-probability-noisy-filter-given-clean*)
```

```
;          )
;     (let* ((min-clean (first (first table-list)))
;           (delta-clean (second (first table-list)))
;           (lower-quantized-clean (+ min-clean (* delta-clean (fix (// (- clean-filter-log-energy min-clean) delta-clean)
;           (upper-quantized-clean (+ lower-quantized-clean delta-clean))
;           )
;       (linear-interpolation lower-quantized-clean
;                             (probability-log-noisy-filter-energy-given-clean
;                               noisy-filter-log-energy lower-quantized-clean filter-index)
;                             upper-quantized-clean
;                             (probability-log-noisy-filter-energy-given-clean
;                               noisy-filter-log-energy upper-quantized-clean filter-index)
;                             clean-filter-log-energy)))

;(defun mean-and-standard-deviation-of-fast-prob-noisy-given-clean-vl
;       (clean-log-energy
;        filter-index
;        &key
;        (table-list *table-fast-probability-noisy-filter-given-clean*)
;        (offset-table NIL)
;        )
;   (let* (
;          (table (third table-list))

;          (num-clean-levels (array-dimension-n 2 table))
;          (num-noisy-levels (array-dimension-n 1 table))
;          (min-clean (first (first table-list)))
;          (delta-clean (second (first table-list)))
;          (clean-index (max 0 (fixr (// (- clean-log-energy min-clean) delta-clean))))
;          (clipped-clean-index (min clean-index (1- num-clean-levels)))
;          (min-diff (first (aref (second table-list) clipped-clean-index filter-index)))
;          (delta-diff (second (aref (second table-list) clipped-clean-index filter-index)))
;          (mean-fb (power-to-db (+ 1 (db-to-power clean-log-energy))))
;          (offset (if (not offset-table) 0
;                      (aref (aref offset-table filter-index) clipped-clean-index)))
;          (minimum-noisy-filter (+ min-diff mean-fb))
;          )

;     (loop for noisy-index from 0 below num-noisy-levels
;           for noisy-filter from minimum-noisy-filter by delta-diff
;           for probability = (aref table noisy-index clipped-clean-index filter-index)
;           sum probability into sum-probability
;           sum (* probability noisy-filter) into mean
;           sum (* probability noisy-filter noisy-filter) into mean-square
;           finally (return (list (- (// mean sum-probability) offset)
;                                 (// (sqrt (max 0.0 (- (* mean-square sum-probability) (* mean mean)))) sum-probability)))
;           )))

;(defun compute-difference-between-expt-and-model-probabilities-vl
;       (&key
;        (offset-table NIL)
;        (noisy-filter-statistics *filterbank-noisy-statistics*)
;        )
;   (let* ((diff-array (make-array *num-mel-filters*))
;          )
;     (loop for filter from 0 below *num-mel-filters*
;           for diff-list = (difference-between-expt-and-model-probabilities-for-filter
;                             filter :offset-table offset-table :noisy-filter-statistics noisy-filter-statistics)
;           do
;           (setf (aref diff-array filter) diff-list)
;           (print (list "filter #" filter))
;           )
;     (sys:dump-forms-to-file "ruby:>adoram>diff-mean-probability-filter-array.bin"
;                             (list '(setq hmm:*diff-mean-probability-filter-array* ',diff-array))
;                             '(:package "hmm"))
;     diff-array
;     ))
;
;(defun difference-between-expt-and-model-probabilities-for-filter
;       (filter-index
;        &key
;        (offset-table NIL)
;        (noisy-filter-statistics *filterbank-noisy-statistics*)
;        )
;   (let* ((mean-noise-in-filter (aref (second noisy-filter-statistics) filter-index))
;          (clean-2d-array (first noisy-filter-statistics))
;          (noisy-arrays (third noisy-filter-statistics))
;          (num-frames (array-dimension-n 1 clean-2d-array))
;          (diff-mean-array (make-array num-frames))
;          (diff-std-array (make-array num-frames))
;          (clean-array (copy-2d-to-1d-array clean-2d-array "second-index" filter-index))
;          (normalized-clean-array (array-constant-subtract clean-array mean-noise-in-filter clean-array))
;          )
;     (loop for frame from 0 below num-frames
;           for normalized-clean = (aref normalized-clean-array frame)
;           for noisy-array = (aref noisy-arrays frame filter-index)
;           for noisy-mean = (array-average noisy-array)
;           for noisy-standard-deviation = (sqrt (array-variance noisy-array))
```

```
;                        for normalized-noisy-mean = (- noisy-mean mean-noise-in-filter)
;                        for model-mean-and-std = (mean-and-standard-deviation-of-fast-prob-noisy-given-clean-v1
;                                                   normalized-clean filter-index :offset-table offset-table)
;                        for model-mean = (first model-mean-and-std)
;                        for model-standard-deviation = (second model-mean-and-std)
;                        do
;
;                 (setf (aref diff-mean-array frame) (- model-mean normalized-noisy-mean))
;                 (setf (aref diff-std-array frame) (- model-standard-deviation noisy-standard-deviation))
;                 )
;            (list normalized-clean-array diff-mean-array diff-std-array)))
;
;
;
;(defun get-offset-values-from-differences-filter-pdf-means
;        (&key
;            (diff-means-array-of-arrays   *diff-mean-probability-filter-array*)
;            (fast-pdf-table               *table-fast-probability-noisy-filter-given-clean*)
;            (smoothing-window             25)
;            (num-filters                  (array-length diff-means-array-of-arrays))
;            (save-table-in-file           NIL)
;            )
;   (let* ((min-norm-clean-filter (first (first fast-pdf-table)))
;          (delta-norm-clean-filter (second (first fast-pdf-table)))
;          (num-clean-filter-levels (array-dimension-n 2 (third fast-pdf-table)))
;          (clean-filter-table-entries-array (make-array num-clean-filter-levels))
;          (offset-array-of-arrays (make-array num-filters))
;          )
;
;      (loop for i from 0 below num-clean-filter-levels
;            for clean-filter-entry from min-norm-clean-filter by delta-norm-clean-filter
;            finally (return clean-filter-table-entries-array)
;            do
;         (setf (aref clean-filter-table-entries-array i) clean-filter-entry))
;
;      (loop for filter from 0 below num-filters
;            for norm-clean-filter-array = (first (aref diff-means-array-of-arrays filter))
;            for diff-array = (second (aref diff-means-array-of-arrays filter))
;            do
;         (setf (aref offset-array-of-arrays filter)
;               (smooth-data-array norm-clean-filter-array diff-array smoothing-window clean-filter-table-entries-array))
;         (print (list "filter #" filter))
;         )
;      (if save-table-in-file
;         (sys:dump-forms-to-file "ruby:>adoram>offset-filter-pdf-table.bin"
;                                 (list '(setq hmm:*offset-filter-pdf-table*',offset-array-of-arrays))
;                                 '(:package "hmm")))
;       offset-array-of-arrays))

;not in use
;(defun old-CHI-SQUARE-PDF (variable
;                           &optional
;                           (num-degrees-of-freedom 2)
;                           (sigma-square           1.0)
;                           )
;   (without-floating-underflow-traps
;      (if (<= variable 0.0) 0.0
;         (if (and (zerop variable) (= num-degrees-of-freedom 2))
;            0.5
;            (// (exp (+ (* 0.6931472 (- (* 0.5 num-degrees-of-freedom)))
;                       (* (log variable) (- (* 0.5 num-degrees-of-freedom) 1))
;                       (- (* 0.5 variable))
;                       ))
;                (* (if (= sigma-square 1.0) 1.0
;                      (expt sigma-square (* 0.5 num-degrees-of-freedom)))
;                   (gamma-function-for-half-integers num-degrees-of-freedom)))))))

;; use this for large number of degrees of freedom where chi-square-pdf makes
;; gross roundoff errors
;;
;(defun APPROXIMATE-CHI-SQUARE-PDF (variable
;                                   &optional
;                                   (num-degrees-of-freedom 40)
;                                   (sigma-square           1.0)
;                                   )
;   (let* ((sigma (if (= sigma-square 1.0) sigma-square (sqrt sigma-square)))
;          (mean (* sigma (sqrt (1- (* 2 num-degrees-of-freedom)))))
;          (gaussian-random-variable (sqrt (* 2 variable)))
;          )
;      (if (<= variable 0) 0
;         (// (- (fast-gaussian-probability-of-data-point gaussian-random-variable mean sigma)
;                (fast-gaussian-probability-of-data-point (- gaussian-random-variable) mean sigma)
;                )
;             gaussian-random-variable))))

;(defun GAMMA-FUNCTION-FOR-HALF-INTEGERS (two-times-variable
;                                         )
```

```
;       (let* ((x (* 0.5 two-times-variable)))
;          (cond ((= x 1) 1.0)
;                ((= x .5) 1.7724539)
;                (t
;                 (loop while (> x 1.0)
;                       with gamma = (if (= x (f1x x)) 1.0
;                                                      1.7724539)
;                       finally (return gamma)
;                       do
;                       (setq gamma (* gamma (1- x)))
;                       (decf x 1))))
;       ))

;not in use
;(defvar *offset-filter-pdf-table*)
;(load "ruby:>adoram>offset-filter-pdf-table.bin")

;not in use
;(defvar *table-fast-probability-noisy-filter-given-clean*)
;(load "ruby:>adoram>table-fast-probability-noisy-filter-given-clean.bin")

;; for large (noncentral-parameter +num-degrees-of-freedom) the N.C.chisquare is
;; approximated by gaussian
;;
;(defun NONCENTRAL-CHI-SQUARE-PDF (variable noncentral-parameter num-degrees-of-freedom
;                                  &optional
;                                  )
;   (without-floating-underflow-traps
;     (let* ((approx-mean (+ noncentral-parameter num-degrees-of-freedom))
;            (approx-sigma (sqrt (+ (* 2 num-degrees-of-freedom) (* 4 noncentral-parameter))))
;            (num-sigma-range 5)
;            )
;       (cond ((> (+ noncentral-parameter num-degrees-of-freedom) 60)
;              (fast-gaussian-probability-of-data-point variable approx-mean approx-sigma)
;              )
;             (T
;              (if (or (< variable (- approx-mean (* num-sigma-range approx-sigma)))
;                      (> variable (+ approx-mean (* num-sigma-range approx-sigma))))
;                  0.0
;                  (loop for j from 0 below (+ noncentral-parameter num-degrees-of-freedom)
;                        with lamda = (* noncentral-parameter 0.5)
;                        with factor = 1.0
;                        for non-central-degrees-of-freedom = (+ num-degrees-of-freedom (* 2 j))
;                        for chi-square = (chi-square-pdf variable non-central-degrees-of-freedom)
;                        sum (* chi-square factor) into accumulated-sum
;                        finally (return (* accumulated-sum (exp (- lamda))))
;                        do
;                        (setq factor (* factor (// lamda (+ j 1.0))))
;                        )
;                  ))))))

;(defun CHI-SQUARE-PDF (variable
;                       &optional
;                       (num-degrees-of-freedom 2)
;                       )
;   (without-floating-underflow-traps
;     (cond ((<= variable 0.0) 0.0)
;           ((> variable (* 10 num-degrees-of-freedom)) 0.0)
;           (T (if (and (zerop variable) (= num-degrees-of-freedom 2))
;                  0.5
;                  (exp (- (+ (* 0.6931472 (- (* 0.5 num-degrees-of-freedom)))
;                             (* (log variable) (- (* 0.5 num-degrees-of-freedom) 1))
;                             (- (* 0.5 variable))
;                             )
;                          (log-gamma-function-for-half-integers num-degrees-of-freedom))))))))

;;This function corrects for the irregularities in the above computation of the
;;conditioned probability, due to the alterations between non-central-chi-square and
;;it approximation by gaussian (see non-central-chisquare). The fix is by
;;extrapolating from values of noisy for which the function is smooth.
;;
(defun message-conditioned-probability-table
       (table
        &key
        (lowest-noisy-to-extrapolate-from
          ;; first line is for standard filters
          '(-10 -10 -10 -10 -10 -10 -9 -8 -7 -6 -6 -5 -4 -4 -3 -2 -2 -2 -2 -2 -1 -1 -1 -1)
          ;; next line is for non-overlapping filters
;;        '(-10 -10 -10 -10 -10 -10 -10 -10 -7 -6 -5 -5 -5 -4 -1 -1 0 0)
          )
        (min-noisy -10)
        (delta-noisy 0.25)
        )
  (let* ((table-array (third table))
         (num-pdf-bins (array-dimension-n 3 table-array))
         )
```

```
(loop for filter from 0 below (array-dimension-n 1 table-array)
    for lowest-bin-to-extrapolate-from = (fixr (// (- (nth filter lowest-noisy-to-extrapolate-from) min-noisy) delta-noisy))
    for extrapolated-left-value = (aref table-array filter lowest-bin-to-extrapolate-from 0)
    do
 (loop for noisy-bin from 0 below lowest-bin-to-extrapolate-from
    for left-value = (aref table-array filter noisy-bin 0)
    for normalization = (// left-value extrapolated-left-value)
    do
  (loop for i from 0 below num-pdf-bins do
    (setf (aref table-array filter noisy-bin i)
        (* (aref table-array filter lowest-bin-to-extrapolate-from i)
           normalization))
   )))))
``` at (0 0 cc)
window (0 0 0)
imagesize (0 0)
imagespace (0 0 0 0)
pagereversal on
prerasterization off
language impress
inputbin PLAIN
paper LETTER
copies 1
jobheader on
papermismatch hold
jamresistance on System Version TURBO UltraScript 4.1T Rev. B IP/II, Serial #86:9:39
Page images processed: 8
Pages printed: 8

Paper size (width, height):
  2560, 3328
Document length:
  38800 bytes

```
;;; ************************************************************************
;;;                    The DECIPHER Speech Recognition System
;;;
;;;    Unpublished-rights reserved under the copyright laws of the United States.
;;;
;;;    This data and information is proprietary to, and a valuable trade
;;;    secret of, SRI International.  It is given in confidence by SRI
;;;    International.  Its use, duplication, or disclosure is subject to the
;;;    restrictions set forth in the License Agreement under which it has
;;;    been distributed.
;;;
;;; ************************************************************************
;;;
;;;                    Unpublished Copyright (c) 1990, SRI International
;;;
;;; ************************************************************************
;;;-*- Mode: LISP; Package: HMM; Syntax: Zetalisp; Base: 10.; -*-

;(load "ruby:>adoram>estimation-auxiliaries.bin")
;(load "otis:>hmm>v1>progs>fps-filterbank.bin")

(defvar *filterbank-pdfs-sorted-by-vq-fb*)
;(load "ruby:>adoram>filterbank-pdfs-spk-norm-sorted-by-32-vq.bin")

(defvar *filterbank-pdfs-sorted-by-vq-in-tree-form*)
;(load "ruby:>adoram>filterbank-pdfs-sorted-by-vq-fb-norm2-in-tree-form.bin")

(defvar *training-filterbank-array-of-arrays*)

(defvar *stop-ml-iterations* NIL)

;(setq *training-filterbank-array-of-arrays* (create-norm-by-speaker-filterbank-data-array))

(defun create-norm-by-speaker-filterbank-data-array
       (&key
        (speaker-list (firstn 10 *tdit-june-88-speaker-training-72-speaker-list-sorted-by-alternating-male-female*))
        (total-num-frames (* 10 30 500))
        )
  (let* ((array-of-arrays (make-array total-num-frames))
         (total-frame-index 0)
         )
    (loop for speaker-id in speaker-list
         while (< total-frame-index total-num-frames)
         for adc-file-list = (get-training-sentences-for-speaker-id speaker-id)
         for filterbank-means = (second (get-speaker-to-array-value speaker-id))
         do
```

```
       (loop for adc-file in adc-file-list
             while (< total-frame-index total-num-frames)
             for waveform = (read-waveform-from-adc-file adc-file :temp-array-p T)
             for array-list = (filterbank-from-waveform-array waveform :create-new-filterbank-array NIL)
             for filterbank-2d-array = (seventh array-list)
             do (loop for frame from 0 below (fourth array-list)
                while (< total-frame-index total-num-frames)
                for array = (make-array *num-mel-filters*)
                do (loop for i from 0 below *num-mel-filters* do (setf (aref array i)(aref filterbank-2d-array frame i)))

(array-subtract array filterbank-means array)
           (setf (aref array-of-arrays total-frame-index) array)
           (incf total-frame-index)
           ))
         )
    (make-array total-frame-index :displaced-to array-of-arrays)))

(defun compute-filterbank-codebook (num-codewords
                                    &key
                                    (data          *training-filterbank-array-of-arrays*)
                                    (codebook-filename "ruby:>adoram>codebook-filterbank-spk-norm-32.bin")
                                    )
  (let* ((codebook (lloyd data num-codewords))
         )
    (write-codebook codebook codebook-filename)
    codebook))

(defun get-filterbank-pdf-sorted-by-vq
       (&key
        (data         *training-filterbank-array-of-arrays*)
        (num-filters  (array-length (aref data 0)))
        (base         -70)
        (bin-size     1)
        (num-bins     100)
        (codebook     (read-codebook "ruby:>adoram>codebook-filterbank-spk-norm-32.bin"))
        (num-vq-bins  (array-length codebook))
        (results-filename  "ruby:>adoram>filterbank-pdfs-spk-norm-sorted-by-32-vq.bin")

(let* ((array-of-histograms (make-array (list num-vq-bins num-filters)))
         output
         )
    (loop for vq-index from 0 below num-vq-bins do
      (loop for filter-index from 0 below num-filters do
        (setf (aref array-of-histograms vq-index filter-index)(array-clear (make-array num-bins)))
        ))

(loop for frame from 0 below (array-length data)
          for filterbank = (aref data frame)
          for vq-index = (vector-quantize-single-vector filterbank codebook num-vq-bins)
          do
      (loop for filter-index from 0 below (array-length filterbank)
            for filter-log-energy = (aref filterbank filter-index)
            for quantized-filter-log-energy = (linear-quantization filter-log-energy base bin-size num-bins)
            do (incf (aref (aref array-of-histograms vq-index filter-index) quantized-filter-log-energy))
        ))

(setq output (list base bin-size array-of-histograms))
    (if (stringp results-filename)
        (sys:dump-forms-to-file results-filename
                                (list '(setq hmm:*filterbank-pdfs-sorted-by-vq-fb* ',output))
                                '(:package "hmm"))).
    output))

(defun maximum-likelihood-diagonal-covariance-gaussian-mixtures
       (&key
        (data                   *training-filterbank-array-of-arrays*)
        (num-frames             (array-length data))
        (histograms             *filterbank-pdfs-sorted-by-vq-fb*)
        (num-mixtures           32)
        (num-filters            (array-length (aref data 0)))
        (initialization         "histograms")
        (epsilon                (* num-filters 1.e-2))
        (results-filename       "ruby:>adoram>gaussian-mixtures-parameters-spk-norm-32.bin")
        )
  (without-floating-underflow-traps
    (let* (
           (gamma (make-array num-mixtures))
           (new-c (make-array num-mixtures))
           (new-mu (make-array (list num-mixtures num-filters)))
           (new-sigma (make-array (list num-mixtures num-filters)))
           (inv-sigma-sq (make-array (list num-mixtures num-filters)))
           (prob-norm-factor-array (make-array num-mixtures))
           (likelihood -1.e30)
```

```
    (new-likelihood 0)
    (inital-array-list
      (cond ((equal initialization "histograms")
              (initialize-gaussian-mixture-parameters-from-histograms histograms num-mixtures num-filters))
            ((listp initialization) initialization)
            (T
              (initialize-gaussian-mixture-parameters-from-data num-mixtures (make-array num-frames :displaced-to data)))
            ))
    (c (first inital-array-list)) (mu (second inital-array-list)) (sigma (third inital-array-list))
    (mu-array-of-arrays (map-multi-d-array-to-array-of-arrays mu))
    (sigma-array-of-arrays (map-multi-d-array-to-array-of-arrays sigma))
    (inv-sigma-sq-sigma-array-of-arrays (map-multi-d-array-to-array-of-arrays inv-sigma-sq))

)

;estimate new parameters by iterations
                                  ;
(loop until (or (< (abs (- new-likelihood likelihood)) epsilon) *stop-ml-iterations*)
      do
                                  ;initalize gaussian normalization constants
    (array-clear prob-norm-factor-array)
    (loop for mixture from 0 below num-mixtures
          for inv-sigma-sq-array = (aref inv-sigma-sq-sigma-array-of-arrays mixture)
          for sigma-array = (aref sigma-array-of-arrays mixture)
          do (loop for k from 0 below num-filters do
        (setf (aref inv-sigma-sq-array k) (// (* (aref sigma-array k) (aref sigma-array k))))
        (decf (aref prob-norm-factor-array mixture) (+ 0.9189386 (log (aref sigma-array k))))
        )
      (incf (aref prob-norm-factor-array mixture) (log (aref c mixture)))
      )

;clear new accumulated sums
    (setq likelihood new-likelihood)
    (setq new-likelihood 0)
    (array-clear new-c)
    (array-clear new-mu)
    (array-clear new-sigma)
                                  ;loop over all speech frames, accumulate averages
                                  ;
    (loop for frame from 0 below num-frames
          with total-probability
          with max-log-prob
          for filterbank = (aref data frame)
          do (loop for mixture from 0 below num-mixtures
            for unnormalized-log-prob =
                (* -0.5 (array-weighted-euclidean-distance-squared-of-known-dimensions
                         filterbank
                         (aref mu-array-of-arrays mixture)
                         (aref inv-sigma-sq-sigma-array-of-arrays mixture)
                         num-filters
                         ))
            do (setf (aref gamma mixture) (+ unnormalized-log-prob (aref prob-norm-factor-array mixture)))
        )

(setq max-log-prob (array-maximum gamma))
      (array-constant-subtract gamma max-log-prob gamma)
      (array-exp gamma gamma)
      (setq total-probability (array-sum gamma))
      (array-constant-divide gamma total-probability gamma)
      (incf new-likelihood (+ (log total-probability) max-log-prob))

(loop for mixture from 0 below num-mixtures
            for gamma-m = (aref gamma mixture)
            do
        (incf (aref new-c mixture) gamma-m)
        (loop for filter from 0 below num-filters
              for energy = (aref filterbank filter)
              do
          (incf (aref new-mu mixture filter)(* gamma-m energy))
          (incf (aref new-sigma mixture filter)(* gamma-m energy energy))
          )
        )
      )

;get new estimated parameters from accumulated sums (loop for mixture from 0 below num-mixtures
          for mu-m = (map-2d-to-1d-array new-mu mixture)
          for sigma-m = (map-2d-to-1d-array new-sigma mixture)
          do
```

```
          (array-constant-divide mu-m (aref new-c mixture) mu-m)
          (array-constant-divide sigma-m (aref new-c mixture) sigma-m)
          (loop for k from 0 below num-filters do
            (decf (aref sigma-m k) (* (aref mu-m k) (aref mu-m k)))
            (setf (aref sigma-m k) (max 1 (aref sigma-m k)))
            )
          (array-square-root sigma-m sigma-m)
          )
        (array-constant-divide new-c (float num-frames) new-c)

;update the gaussian parameters
                                            ;
        (copy-array-contents new-c c)
        (copy-array-contents new-mu mu)
        (copy-array-contents new-sigma sigma)
        (setq new-likelihood (// new-likelihood (float num-frames)))

(print (list likelihood new-likelihood))
        )
     (if (stringp results-filename)
         (sys:dump-forms-to-file results-filename
                                 (list '(setq *gaussian-mixtures-parameters*',(list c mu sigma)))
                                 '(:package "hmm")))
     (list c mu sigma)
     )))

(defun initialize-gaussian-mixture-parameters-from-histograms (histograms num-mixtures num-filters)
  (if (arrayp histograms)(initialize-gaussian-mixture-parameters-from-tree-histograms histograms num-mixtures num-filters)
      (let* ((histogram-array (third histograms))
             (base (first histograms))
             (bin-size (second histograms))
             (c (make-array num-mixtures))
             (mu (make-array (list num-mixtures num-filters)))
             (sigma (make-array (list num-mixtures num-filters)))
             )
        (loop for mixture from 0 below num-mixtures do
          (setf (aref c mixture) (array-sum (aref histogram-array mixture 0)))
          (loop for filter from 0 below num-filters
                for gaussian-parameters = (compute-gaussian-parameters-from-histogram
                                            (list base bin-size (aref histogram-array mixture filter)))
                for mean = (first gaussian-parameters)
                for standard-deviation = (second gaussian-parameters)

do
            (setf (aref mu mixture filter) mean)
            (setf (aref sigma mixture filter) standard-deviation)
            )
        (array-normalize-sum c c)
        (list c mu sigma)
        )))

(defun compute-gaussian-parameters-from-histogram (histogram
                                                   &optional
                                                   (left-limit 0)
                                                   (right-limit (array-length (third histogram))))
  (let* ((histogram-array (third histogram))
         (base (first histogram))
         (bin-size (second histogram))
         )
    (loop for i from left-limit below right-limit
          with sum-mean = 0
          with sum-mean-sq = 0
          with sum-n = 0.0
          with mean = nil
          for ni = (aref histogram-array i)
          for ni-i = (* ni i)
          finally (return (progn (setq mean (// sum-mean sum-n ))
                                 (list (+ base (* bin-size mean))
                                       (* bin-size (sqrt (- (// sum-mean-sq sum-n) (* mean mean)))))))
          do
      (incf sum-mean ni-i)
      (incf sum-mean-sq (* ni-i i))
      (incf sum-n ni))))

(defun initialize-gaussian-mixture-parameters-from-data (num-mixtures data-array-of-arrays)
  (let* ((num-filters (array-length (aref data-array-of-arrays 0)))
         (num-frames (array-length data-array-of-arrays))
         (c (make-array num-mixtures))
         (mu-array (make-array (list num-mixtures num-filters)))
         (sigma-array (make-array (list num-mixtures num-filters)))
         (single-mix-mean (array-clear (make-array num-filters)))
         (single-mix-sigma (array-clear (make-array num-filters)))
         )
    (fillarray c (list (// (float num-mixtures))))
    (loop for frame from 0 below num-frames
          for filterbank = (aref data-array-of-arrays frame)
          do
```

```
      (loop for filter from 0 below num-filters
            for x = (aref filterbank filter)
            do
        (incf (aref single-mix-mean filter) x)
        (incf (aref single-mix-sigma filter) (* x x))
        ))
    (array-constant-divide single-mix-mean num-frames single-mix-mean)
    (array-constant-divide single-mix-sigma num-frames single-mix-sigma)
    (array-subtract single-mix-sigma (array-square single-mix-mean (make-array num-filters)) single-mix-sigma)
    (array-square-root single-mix-sigma single-mix-sigma)

(loop for filter from 0 below num-filters do
      (loop for mixture from 0 below num-mixtures
            with single-mean = (aref single-mix-mean filter)
            with single-sigma = (aref single-mix-sigma filter)
            with delta-mean = (// (* 2 single-sigma) (float num-mixtures))
            with sigma = (// single-sigma (float num-mixtures))
            for mean from (- single-mean single-sigma) by delta-mean
            do
        (setf (aref mu-array mixture filter) mean)
        (setf (aref sigma-array mixture filter) sigma)
        ))
    (list c mu-array sigma-array)))

;(defun log-diagonal-covariance-gaussian-probability (vector mean-array sigma-array)
;   (loop for k from 0 below (array-length mean-array)
;         with log-sqrt-2pi = 0.9189386
;         for sigma = (aref sigma-array k)
;         for x = (// (- (aref vector k)(aref mean-array k)) sigma)
;         sum (* x x) into exponent
;         sum (+ log-sqrt-2pi (log sigma)) into norm-factor
;         finally (return (- (* -0.5 exponent) norm-factor))
;    ))

(defun log-full-covariance-gaussian-probability (vector mean-array inverse-covar-matrix log-determinant)
  (let* ((dimension (array-length vector))
         (exponent 0)
         (log-norm (- (* dimension 0.9189386)(* 0.5 log-determinant)))
         )
    (loop for i from 0 below dimension do
      (loop for j from 0 below dimension do
        (incf exponent (* (aref inverse-covar-matrix i j)
                          (- (aref vector i)(aref mean-array i))
                          (- (aref vector j)(aref mean-array j))
        ))))
    (- (* -0.5 exponent) log-norm)))

(defun initialize-gaussian-mixture-parameters-from-tree-histograms (histograms num-mixtures num-filters)
  (let* ((tree-level (fixr (cl:log num-mixtures 2.0)))
         (histogram-array (aref histograms tree-level))
         (c (make-array num-mixtures))
         (mu (make-array (list num-mixtures num-filters)))
         (sigma (make-array (list num-mixtures num-filters)))
         )
    (loop for mixture from 0 below num-mixtures do
      (setf (aref c mixture) (array-sum (third (aref histogram-array mixture 0))))
      (loop for filter from 0 below num-filters
            for gaussian-parameters = (compute-gaussian-parameters-from-histogram (aref histogram-array mixture filter))
            for mean = (first gaussian-parameters)
            for standard-deviation = (second gaussian-parameters)

do
        (setf (aref mu mixture filter) mean)
        (setf (aref sigma mixture filter) standard-deviation)
        )
      )
    (array-normalize-sum c c)
    (list c mu sigma)
    ))

(defun filterbank-correlations
       (filter-1-index filter-2-index
        &key
        (data      *training-filterbank-array-of-arrays*)
        (codebook (read-codebook "ruby:>adoram>codebook-filterbank-spk-norm-32.bin"))
        (num-frames (array-length data))
        )

(let* ((num-vq-bins (array-length codebook))
         (correlation-array (list (make-array num-vq-bins)
                                  (make-array num-vq-bins)))
```

```
      )
   (loop for bin from 0 below num-vq-bins do
     (setf (aref (first correlation-array) bin) (array-clear (make-array 6)))
     )
   (loop for frame from 0 below num-frames
         for filterbank = (aref data frame)
         for filter-1 = (aref filterbank filter-1-index)
         for filter-2 = (aref filterbank filter-2-index)
         for cross-term = (* filter-1 filter-2)
         for square-1 = (* filter-1 filter-1)
         for square-2 = (* filter-2 filter-2)
         for vq-index = (vector-quantize-single-vector filterbank codebook num-vq-bins)
         for accumulating-sums = (aref (first correlation-array) vq-index)
         do
     (incf (aref accumulating-sums 0))
     (incf (aref accumulating-sums 1) filter-1)
     (incf (aref accumulating-sums 2) filter-2)
     (incf (aref accumulating-sums 3) square-1)
     (incf (aref accumulating-sums 4) square-2)
     (incf (aref accumulating-sums 5) cross-term)
     )

(loop for bin from 0 below num-vq-bins
         for sums-array = (aref (first correlation-array) bin)
         for num-frames = (aref sums-array 0)
         for mean-1 = (// (aref sums-array 1) num-frames)
         for mean-2 = (// (aref sums-array 2) num-frames)
         for mean-square-1 = (// (aref sums-array 3) num-frames)
         for mean-square-2 = (// (aref sums-array 4) num-frames)
         for mean-cross = (// (aref sums-array 5) num-frames)
         for sigma-1 = (sqrt (- mean-square-1 (* mean-1 mean-1)))
         for sigma-2 = (sqrt (- mean-square-2 (* mean-2 mean-2)))
         for correlation = (// (- mean-cross (* mean-1 mean-2))
                               sigma-1 sigma-2)
         sum (abs correlation) into average-correlation
         finally (return (values (// average-correlation (float num-vq-bins)) correlation-array))
         do
     (setf (aref (second correlation-array) bin) correlation)
     )
))

;
;(defun maximum-likelihood-full-covariance-gaussian-mixtures
;       (&key
;        (data                   *training-filterbank-array-of-arrays*)
;        (num-frames             (array-length data))
;        (histograms             *filterbank-pdfs-sorted-by-vq-fb*)
;        (num-mixtures           32)
;        (num-filters            (array-length (aref data 0)))
;        (initialization         "histograms")
;        (epsilon                (* num-filters 1.e-3))
;        )
;  (without-floating-underflow-traps
;    (let* ((gamma (make-array num-mixtures))
;           (new-c (make-array num-mixtures))
;           (new-mu (make-array (list num-mixtures num-filters)))
;           (inv-covar (array-clear (make-array (list num-mixtures num-filters num-filters))))
;           (new-covar (make-array (list num-mixtures num-filters num-filters)))
;           (likelihood -1.e30)
;           (new-likelihood 0)
;           (inital-array-list
;             (cond ((equal initialization "histograms")
;                    (initialize-gaussian-mixture-parameters-from-histograms histograms num-mixtures num-filters))
;                   ((listp initialization) initialization)
;                   (T
;                    (initialize-gaussian-mixture-parameters-from-data num-mixtures (make-array num-frames
;                        :displaced-to data)))
;                   ))
;           (c (first inital-array-list)) (mu (second inital-array-list)) (sigma (third inital-array-list))
;           (log-determinant-array (make-array num-mixtures))
;           )

;     (loop for mixture from 0 below num-mixtures
;           for matrix = (map-multid-to-multid-minus-1-array inv-covar mixture)
;           do
;       (loop for filter from 0 below num-filters
;             for sig = (aref sigma mixture filter) do
;         (setf (aref matrix filter filter)(// (* sig sig)))
;         )
;       (setf (aref log-determinant-array mixture) (log (math:determinant matrix)))
;       )

;                                        ;estimate new parameters by iterations
;                                        ;
;     (loop until (or (< (abs (- new-likelihood likelihood)) epsilon) *stop-ml-iterations*)
;           do
;       (setq likelihood new-likelihood)
;       (setq new-likelihood 0)
;       (array-clear new-c)
;       (array-clear new-mu)
;       (array-clear new-covar)
```

```
;                                                  ;loop over all speech frames, accumulate averages
;                                                  ;
;       (loop for frame from 0 below num-frames
;             with total-probability
;             with max-log-prob
;             for filterbank = (aref data frame)
;             do
;         (loop for mixture from 0 below num-mixtures
;               for log-prob = (log-full-covariance-gaussian-probability filterbank
;                                                              (map-2d-to-1d-array mu mixture)
;                                                              (map-multid-to-multid-minus-1-array inv-covar mixtur
;                                                              (aref log-determinant-array mixture)
;                                                              )
;               do
;           (setf (aref gamma mixture) (+ log-prob (log (aref c mixture))))
;           )
;         (setq max-log-prob (array-maximum gamma))
;         (array-constant-subtract gamma max-log-prob gamma)
;         (array-exp gamma gamma)
;         (setq total-probability (array-sum gamma))
;         (array-constant-divide gamma total-probability gamma)
;         (incf new-likelihood (+ (log total-probability) max-log-prob))
;
;         (loop for mixture from 0 below num-mixtures
;               for gamma-m = (aref gamma mixture)
;               do
;           (incf (aref new-c mixture) gamma-m)
;           (loop for filter-i from 0 below num-filters
;                 for energy-i = (aref filterbank filter-i)
;                 do
;             (incf (aref new-mu mixture filter-i)(* gamma-m energy-i))
;             (loop for filter-j from 0 below num-filters do
;               (incf (aref new-covar mixture filter-i filter-j)(* gamma-m energy-i (aref filterbank filter-j)))
;               )))
;         )
;                                                  ;get new estimated parameters from accumulated sums
;       (loop for mixture from 0 below num-mixtures
;             for mu-m = (map-2d-to-1d-array new-mu mixture)
;             for covar-m = (map-multid-to-multid-minus-1-array new-covar mixture)
;             do
;         (array-constant-divide mu-m (aref new-c mixture) mu-m)
;         (array-multid-constant-multiply covar-m (// (aref new-c mixture)) covar-m)
;         (loop for i from 0 below num-filters do
;           (loop for j from 0 below num-filters do
;             (decf (aref covar-m i j) (* (aref mu-m i) (aref mu-m j)))
;             ))
;         (math:invert-matrix covar-m (map-multid-to-multid-minus-1-array inv-covar mixture))
;         )
;       (array-constant-divide new-c (float num-frames) new-c)
;       (copy-array-contents new-c c)
;       (copy-array-contents new-mu mu)
;       (setq new-likelihood (// new-likelihood (float num-frames)))
;
;       (print (list likelihood new-likelihood))
;       )
;     (list c mu new-covar)
;     )))
;
;(defun simulate-gaussian-mixture-distribution-for-parameter-arrays
;        (num-frames mix-prob-array mu sigma)
;
;  (let* (data-array-of-arrays
;          (num-mixtures (array-length mix-prob-array))
;          (num-filters (array-dimension-n 2 mu))
;          (num-frames-per-mixture (make-array num-mixtures))
;          )
;    (array-constant-multiply mix-prob-array num-frames num-frames-per-mixture)
;    (array-fixr num-frames-per-mixture num-frames-per-mixture)
;    (setq num-frames (array-sum num-frames-per-mixture))
;    (setq data-array-of-arrays (make-array num-frames))
;
;    (loop for mixture from 0 below num-mixtures
;          with initial-frame = 0
;          do
;
;      (loop for relative-frame from 0 below (aref num-frames-per-mixture mixture)
;            for frame = (+ relative-frame initial-frame)
;            for filterbank = (make-array num-filters)
;            do
;        (setf (aref data-array-of-arrays frame) filterbank)
;        (loop for filter from 0 below num-filters
;              for mean = (aref mu mixture filter)
;              for standard-deviation = (aref sigma mixture filter)
;              do
;          (setf (aref filterbank filter)(get-gaussian-random-variable :mean mean :standard-deviation standard-deviation))
;          ))
;      (incf initial-frame (aref num-frames-per-mixture mixture))
;      )
;    data-array-of-arrays))
```

```
;
;
;
;(defun simulate-gaussian-mixture-distribution (num-mixtures num-filters num-frames
;                                                &key (delta-mean-over-sigma 2))
;   (let* ((data-array-of-arrays (make-array num-frames))
;          (mu (make-array (list num-mixtures num-filters)))
;          (sigma (fillarray (make-array (list num-mixtures num-filters)) '(1.0)))
;          )
;     (loop for mixture from 0 below num-mixtures
;           for mean-array = (map-2d-to-1d-array mu mixture)
;           do
;       (fillarray mean-array (list (* delta-mean-over-sigma mixture))))
;
;     (loop for frame from 0 below num-frames
;           for mixture = (cl:random num-mixtures)
;           for filterbank = (make-array num-filters)
;           do
;       (setf (aref data-array-of-arrays frame) filterbank)
;
;       (loop for filter from 0 below num-filters
;             for mean = (aref mu mixture filter)
;             for standard-deviation = (aref sigma mixture filter)
;             do
;         (setf (aref filterbank filter)(get-gaussian-random-variable :mean mean :standard-deviation standard-deviation))
;         ))
;     data-array-of-arrays))

;(defun integral-of-two-gaussian-product (mean-1 sigma-1 mean-2 sigma-2)
;   (let* ((sigma (sqrt (// (+ (// (* sigma-1 sigma-1)) (// (* sigma-2 sigma-2))))))
;          (norm-mean-1 (// mean-1 sigma-1))
;          (norm-mean-2 (// mean-2 sigma-2))
;          )
;     (* (// (sqrt (* 2.0 (cl:acos -1.0))) )
;        (// sigma (* sigma-1 sigma-2))
;        (exp (* 0.5
;                (- (* sigma sigma (expt (+ (// norm-mean-1 sigma-1)(// norm-mean-2 sigma-2)) 2))
;                   (+ (* norm-mean-1 norm-mean-1) (* norm-mean-2 norm-mean-2))
;                   )
;                ))) 
;       ))

;(defun expected-probability-for-gaussian-mixtures-random-vectors (c mu sigma)
;   (let* ((num-mixtures (array-length c))
;          (num-filters (array-dimension-n 2 mu))
;          log-expected-probability
;          )
;     (loop for i from 0 below num-mixtures do
;       (loop for j from 0 below num-mixtures
;             for product = (loop for filter from 0 below num-filters
;                                 with product = 1.d0
;                                 for integral = (integral-of-two-gaussian-product
;                                                  (aref mu i filter)(aref sigma i filter)
;                                                  (aref mu j filter)(aref sigma j filter)
;                                                  )
;                                 finally (return product)
;                                 do (setq product (* product integral))
;                                 )
;             sum (* (aref c i)(aref c j) product) into accumulator
;             finally (setq log-expected-probability (log accumulator))
;             ))
;     (float log-expected-probability)))

;(defun create-norm2-filterbank-data-array (adc-file-list)
;   (let* ((sid-list     (compute-and-set-normalized-log-filterbank-for-waveform-file-list
;                          adc-file-list :normalization-algorithm 2))
;          (num-frames   (compute-num-frames-for-sid-list sid-list 'norm-log-filterbank))
;          (array-of-data-arrays (make-array num-frames))
;          )
;     (put-data-arrays-into-large-array array-of-data-arrays sid-list 'norm-log-filterbank)
;     ))
```

```
at (0 0 cc)
window (0 0 0)
imagesize (0 0)
imagespace (0 0 0 0)
pagereversal on
prerasterization off
language impress
inputbin PLAIN
paper LETTER
copies 1
jobheader on
papermismatch hold
jamresistance on System Version TURBO UltraScript 4.1T Rev. B IP/II, Serial #86:9:39
Page images processed: 4
Pages printed: 4

Paper size (width, height):
  2560, 3328
Document length:
  23128 bytes

;;; *************************************************************
;;;                The DECIPHER Speech Recognition System
;;;
;;;   Unpublished-rights reserved under the copyright laws of the United States.
;;;
;;;   This data and information is proprietary to, and a valuable trade
;;;   secret of, SRI International. It is given in confidence by SRI
;;;   International. Its use, duplication, or disclosure is subject to the
;;;   restrictions set forth in the License Agreement under which it has
;;;   been distributed.
;;;
;;; *************************************************************
;;;
;;;                Unpublished Copyright (c) 1990, SRI International
;;;
;;; *************************************************************
;;;-*- Mode: LISP; Package: HMM; Syntax: Zetalisp; Base: 10.;   -*-

;(load "otis:>hmm>v1>progs>fps-filterbank.bin")
;(load "ruby:>adoram>fps-frequency-bands.bin")
;(load "ruby:>adoram>estimation-auxiliaries.bin")

;(load "ruby:>adoram>filterbank-pdfs-sorted-by-freq-band-vq.bin")

(defvar *freq-band-vq-probability-estimation-table*)
(load "ruby:>adoram>freq-band-probability-vq-estimation-32.bin")

(defvar *temp-freq-band-probability-in-bin* (make-array 256))

(defvar *estimation-table-by-freq-band* )
(load "ruby:>adoram>filterbank-estimation-table-freq-band-vq-32.bin")

(defvar *mean-noise-freq-band-array* (make-array *num-freq-bands*))
(defvar *mean-noise-log-freq-band-array* (make-array *num-freq-bands*))

(defvar *temp-freq-band-signal-to-noise-array* (make-array *num-freq-bands*))

(defvar *temp-estimation-table-noisy-entries* (make-array (list *num-freq-bands* 3)))

(defun spectral-estimation-freq-band-for-tdit
       (noise-total-energy
        freq-band-means
        freq-band-2d-array
        filterbank-means
        log-filter-energy-2d-array
        &key
        (mean-noise-filterbank-energy     *mean-noise-filter-log-energy-array*)
        (signal-to-noise-in-filterbank    *temp-signal-to-noise-array*)
        (mean-noise-freq-band-energy      *mean-noise-log-freq-band-array*)
        (signal-to-noise-in-freq-band     *temp-freq-band-signal-to-noise-array*)
        (filterbank-estimation-table      *estimation-table-by-freq-band*)
        (freq-band-estimation-table       *freq-band-vq-probability-estimation-table*)
        (filter-log-energy-for-0-db-noise-array
          *filter-log-energy-for-0-db-preemp-total-energy-pink-noise-array*)
        (freq-band-log-energy-for-0-db-noise-array
          *freq-band-log-energy-for-0-db-preemp-total-energy-pink-noise-array*)
        (freq-band-probability-array   (make-array (array-length (first freq-band-estimation-table))
                                                   :displaced-to *temp-freq-band-probability-in-bin*))
```

```
                                )
        (array-constant-add filter-log-energy-for-0-db-noise-array noise-total-energy mean-noise-filterbank-energy)
        (array-constant-add freq-band-log-energy-for-0-db-noise-array noise-total-energy mean-noise-freq-band-energy)

(spectral-estimation-freq-band freq-band-means freq-band-2d-array
                                       filterbank-means log-filter-energy-2d-array
                                       :mean-noise-filterbank-energy mean-noise-filterbank-energy
                                       :mean-noise-freq-band-energy mean-noise-freq-band-energy
                                       :signal-to-noise-in-filterbank signal-to-noise-in-filterbank
                                       :signal-to-noise-in-freq-band signal-to-noise-in-freq-band
                                       :filterbank-estimation-table filterbank-estimation-table
                                       :freq-band-estimation-table freq-band-estimation-table
                                       :freq-band-probability-array freq-band-probability-array
                                       )
        )

(defun spectral-estimation-freq-band
       (freq-band-means freq-band-2d-array
        filterbank-means log-filter-energy-2d-array
        &key
        (mean-noise-filterbank-energy      *mean-noise-filter-log-energy-array*)
        (mean-noise-freq-band-energy       *mean-noise-log-freq-band-array*)
        (signal-to-noise-in-filterbank     *temp-signal-to-noise-array*)
        (signal-to-noise-in-freq-band      *temp-freq-band-signal-to-noise-array*)
        (filterbank-estimation-table       *estimation-table-by-freq-band*)
        (freq-band-estimation-table        *freq-band-vq-probability-estimation-table*)
        (freq-band-probability-array       (make-array (array-length (first freq-band-estimation-table))
                                                      :displaced-to *temp-freq-band-probability-in-bin*))
        )

(array-subtract filterbank-means mean-noise-filterbank-energy signal-to-noise-in-filterbank)
  (array-subtract freq-band-means mean-noise-freq-band-energy signal-to-noise-in-freq-band)

(translate-filterbank-snr-to-table-snr-entries signal-to-noise-in-filterbank signal-to-noise-in-filterbank
                                                 filterbank-estimation-table)
  (translate-filterbank-snr-to-table-snr-entries signal-to-noise-in-freq-band signal-to-noise-in-freq-band (second freq-band-estimation-table))

(loop for frame-number from 0 below (array-dimension-n 1 log-filter-energy-2d-array)
        for filterbank = (map-2d-to-1d-array log-filter-energy-2d-array frame-number)
        for freq-band = (map-2d-to-1d-array freq-band-2d-array frame-number)
        do
     (array-subtract filterbank mean-noise-filterbank-energy filterbank)
     (array-subtract freq-band mean-noise-freq-band-energy freq-band)

(estimate-filterbank-by-freq-band-vq-for-frame freq-band filterbank
                                                   :freq-band-signal-to-noise signal-to-noise-in-freq-band
                                                   :signal-to-noise-in-filterbank signal-to-noise-in-filterbank
                                                   :filterbank-estimation-table filterbank-estimation-table
                                                   :freq-band-estimation-table freq-band-estimation-table
                                                   :freq-band-probability-array freq-band-probability-array
                                                   )
     (array-add filterbank mean-noise-filterbank-energy filterbank)
     )
  )

(defvar *ONE-DIMENSIONAL-ESTIMATION-TABLE-FILTERBANK-BY-FREQ-BAND*)
(setq *ONE-DIMENSIONAL-ESTIMATION-TABLE-FILTERBANK-BY-FREQ-BAND*
      (let* ((table *estimation-table-by-freq-band*)
             (num-dim     (array-length table))
             (the-array   (make-array num-dim))
             (dimension-list (array-dimensions (second (aref table 0))))
             (total-length  (apply #'* dimension-list))
             )
        (loop for i from 0 below num-dim
              do
           (setf (aref the-array i)
                 (make-array total-length :displaced-to (second (aref table i)))))
        the-array))

(defvar *ONE-DIMENSIONAL-ESTIMATION-TABLE-FREQ-BAND*
      (let* ((table (second *freq-band-vq-probability-estimation-table*))
             (num-dim     (array-length table))
             (the-array   (make-array num-dim))
             (dimension-list (array-dimensions (second (aref table 0))))
             (total-length  (apply #'* dimension-list))
             )
        (loop for i from 0 below num-dim
              do
           (setf (aref the-array i)
                 (make-array total-length :displaced-to (second (aref table i)))))
        the-array))

(defun estimate-filterbank-by-freq-band-vq-for-frame
       (freq-band
        filterbank
        &key
        (freq-band-signal-to-noise      *temp-freq-band-signal-to-noise-array*)
        (signal-to-noise-in-filterbank  *temp-signal-to-noise-array*)
```

```
                    (filterbank-estimation-table        *estimation-table-by-freq-band*)
                    (freq-band-estimation-table         *freq-band-vq-probability-estimation-table*)
                    (freq-band-probability-array        *temp-freq-band-probability-in-bin*)
                    (one-d-filterbank-estimation-table  *one-dimensional-estimation-table-filterbank-by-freq-band*)
                    )
        (let* ((table-entry-parameters    (first (aref filterbank-estimation-table 0)))
               (min-noisy                 (fourth table-entry-parameters))
               (delta-noisy               (fifth  table-entry-parameters))
               (num-noisy-energy-entries  (sixth  table-entry-parameters))
               (num-noisy-energy-entries-1 (1- num-noisy-energy-entries))
               (table-array-0             (second (aref filterbank-estimation-table 0)))
               (scale-2                   (array-dimension-n 3 table-array-0))
               (scale-1                   (* (array-dimension-n 2 table-array-0) scale-2))
               )
          (if (listp freq-band-estimation-table)
              (get-probability-for-freq-band-bin freq-band
                                                 :signal-to-noise-array freq-band-signal-to-noise
                                                 :cond-prob-bin-array freq-band-probability-array
                                                 :estimation-table freq-band-estimation-table)
              )

(loop for filter-index from 0 below (array-length filterbank)
                for noisy-log-filter-energy = (aref filterbank filter-index)
                for signal-to-noise-index  = (aref signal-to-noise-in-filterbank filter-index)
                for norm-noisy             = (max 0 (// (- noisy-log-filter-energy min-noisy) delta-noisy))
                for low-noisy-index        = (max 0 (fix norm-noisy))
                for up-noisy-index         = (if (= norm-noisy low-noisy-index) low-noisy-index
                                                 (+ 1 low-noisy-index))

for base-linear-index      = (+ (* scale-1 filter-index) (* scale-2 signal-to-noise-index))
                for low-linear-index       = (+ base-linear-index low-noisy-index)
                for up-linear-index        = (+ base-linear-index up-noisy-index)

do
                (setf (aref filterbank filter-index)
                      (loop for freq-band-bin from 0 below (array-length freq-band-probability-array)
                            for prob-freq-band-bin = (aref freq-band-probability-array freq-band-bin)

for table-array = (aref one-d-filterbank-estimation-table freq-band-bin)

for bin-estimate = (if (plusp prob-freq-band-bin)
                                                   (if (< low-noisy-index num-noisy-energy-entries-1)
                                                       (linear-interpolation
                                                        low-noisy-index
                                                        (aref table-array low-linear-index)
                                                        up-noisy-index
                                                        (aref table-array up-linear-index)
                                                        norm-noisy)
                                                       noisy-log-filter-energy)
                                                   0.0)
                            sum (* prob-freq-band-bin bin-estimate) into weighted-estimate
                            finally (return weighted-estimate)
                            )))))

(defun get-probability-for-freq-band-bin
        (freq-band
         &key
         (signal-to-noise-array     *temp-freq-band-signal-to-noise-array*)
         (cond-prob-bin-array       *temp-freq-band-probability-in-bin*)
         (estimation-table          *freq-band-vq-probability-estimation-table*)
         (temp-table-noisy-entries  *temp-estimation-table-noisy-entries*)
         )

(without-floating-underflow-traps
    (let* ((prob-mixtures (first estimation-table))
           (num-mixtures (array-length prob-mixtures))
           )

(loop for mixture from 0 below num-mixtures
            for prob = (loop for filter from 0 below (array-length freq-band)
                             with product = 1
                             for noisy = (aref freq-band filter)
                             for prob-x-given-n = (get-prob-x-given-n-from-estimation-table
                                                   filter (aref signal-to-noise-array filter)
                                                   (aref freq-band filter)
                                                   :table (aref (second estimation-table) mixture)
                                                   :initialization (if (zerop mixture) T NIL)
                                                   :noisy-table-entries temp-table-noisy-entries
                                                   )
                             finally (return product)
                             do
                             (setq product (* product prob-x-given-n))
                             )
            for prob-mixture = (aref prob-mixtures mixture)
            for cond-prob = (* prob prob-mixture)
            do
            (setf (aref cond-prob-bin-array mixture) cond-prob)
```

```
        )
        (array-normalize-sum cond-prob-bin-array cond-prob-bin-array)

(loop for bin from 0 below num-mixtures
              with epsilon = (// 0.1 num-mixtures)
              do
           (if (< (aref cond-prob-bin-array bin) epsilon)(setf (aref cond-prob-bin-array bin) 0.0))
           )
        (array-normalize-sum cond-prob-bin-array cond-prob-bin-array)

cond-prob-bin-array)))

(defun get-prob-x-given-n-from-estimation-table (filter-index
                                                 signal-to-noise-index
                                                 noisy-log-filter-energy
                                                 &key
                                                 (table             NIL)
                                                 (initialization    T)
                                                 (noisy-table-entries NIL)
                                                 )
  (let* ((table-array (second table))
         (table-entry-parameters (first table))
         norm-noisy low-noisy-index up-noisy-index
         )
    (cond (initialization
           (setq norm-noisy (max 0 (// (- noisy-log-filter-energy (fourth table-entry-parameters))
                                       (fifth table-entry-parameters))))
           (setq low-noisy-index (max 0 (fix norm-noisy)))
           (setq up-noisy-index (if (= norm-noisy low-noisy-index) low-noisy-index
                                    (+ 1 low-noisy-index)))
           (cond ((arrayp noisy-table-entries)
                  (setf (aref noisy-table-entries filter-index 0) low-noisy-index)
                  (setf (aref noisy-table-entries filter-index 1) up-noisy-index)
                  (setf (aref noisy-table-entries filter-index 2) norm-noisy)
                  )
                 ))
          (T
           (setq low-noisy-index (aref noisy-table-entries filter-index 0))
           (setq up-noisy-index (aref noisy-table-entries filter-index 1))

(setq norm-noisy (aref noisy-table-entries filter-index 2))
           )
          )
    (if (< up-noisy-index (array-dimension-n 3 table-array))
        (linear-interpolation low-noisy-index (aref table-array filter-index signal-to-noise-index low-noisy-index)
                              up-noisy-index (aref table-array filter-index signal-to-noise-index up-noisy-index)
                              norm-noisy)
      0)
    ))

;(defun get-probability-for-clean-freq-band-bin (freq-band
;                                                &key
;                                                (cond-prob-bin-array *temp-freq-band-probability-in-bin*)
;                                                (codebook *temp-codebook*)
;                                                (signal-to-noise-array    *temp-freq-band-signal-to-noise-array*)
;                                                (estimation-table         *freq-band-vq-probability-estimation-table*)
;                                                (temp-table-noisy-entries *temp-estimation-table-noisy-entries*)
;                                                )
;  (array-clear cond-prob-bin-array)
;  (let* ((vq-index (vector-quantize-single-vector freq-band codebook (array-length codebook)))
;         )
;    (incf (aref cond-prob-bin-array vq-index)))
;  cond-prob-bin-array)
``` at (0 0 cc)
window (0 0 0)
imagesize (0 0)
imagespace (0 0 0 0)
pagereversal on
prerasterization off
language impress
inputbin PLAIN
paper LETTER
copies 1
jobheader on
papermismatch hold
jamresistance on

```
System Version TURBO UltraScript 4.1T Rev. B IP/II, Serial #86:9:39
Page images processed: 16
Pages printed: 16

Paper size (width, height):
  2560, 3328
Document length:
  74776 bytes

;;; ***********************************************************
;;;                The DECIPHER Speech Recognition System
;;;
;;;   Unpublished-rights reserved under the copyright laws of the United States.
;;;
;;;   This data and information is proprietary to, and a valuable trade
;;;   secret of, SRI International. It is given in confidence by SRI
;;;   International. Its use, duplication, or disclosure is subject to the
;;;   restrictions set forth in the License Agreement under which it has
;;;   been distributed.
;;;
;;; ***********************************************************
;;;
;;;                Unpublished Copyright (c) 1990, SRI International
;;;
;;; ***********************************************************
;;;-*- Mode: LISP; Package: HMM; Syntax: Zetalisp; Base: 10.; -*-

#|
()oad "ruby:>adoram>estimation-auxiliaries.bin")
(load "ruby:>adoram>fps-frequency-bands.bin")
(load "otis:>hmm>v1>progs>fps-filterbank.bin")
(load "ruby:>adoram>estimation-vq-freq-bands")
;; compile buffer ruby:>adoram>vq-noisy-by-speaker.lisp run function
(vector-quantize-list-of-noisy-adc-files-to-sun-vq-format-after-spectral-estimation-by-speaker
        :signal-to-noise-ratio-in-db  10.0
        :noisy-vq-file-directory      "wimpy://cdc3//database//res-man//vq-param//noisy//snr10-freq-bands-fb-order4//"
        :estimation-algorithm         "freq-bands-fb"
)
|#

(defvar *CURRENT-MODEL-ORDER-NUMBER*)
(setq   *current-model-order-number* 2)

;; *********************************************************
;;
;; NOTE: the variables *NUM-FREQ-BANDS-LEVELS* *FREQ-BANDS-BIN-SIZE* and
;; *LOWEST-FREQ-BANDS-LEVEL* must correspond to the table that is loaded where the
;; variable *prob-noisy-te-given-clean-bin-table-freq-bands* is set
;;
;; if you change these variables, you must change the file that is loaded
;;
;; *********************************************************
;;
(defvar *NUM-FREQ-BANDS-LEVELS*  32)

(defvar *INITAL-CONDITION-ARRAY*)
(defvar *FINAL-CONDITION-ARRAY*)
(defvar *STATE-TRANSITION-ARRAY*)

(defun TRAIN-FREQ-BANDS-TRANSITIONS-FROM-DATABASE
        (&key
         (save-in-file T)
         (freq-band-codebook (read-codebook "otis:>hmm>v1>codebooks>freq-bands-32-codebook"))
         )
  (let* (output)

;; *********************************************************
    ;;
    ;; COMPUTE STATISTICS FOR MARKOV MODELS ORDER 1 THROUGH 3
    ;;
    ;; *********************************************************

(setq *inital-condition-array*
          (list
           (make-array *num-freq-bands-levels* :initial-value 0.0)
           (make-array (list *num-freq-bands-levels* *num-freq-bands-levels*)
                       :initial-value 0.0)
           (make-array (list *num-freq-bands-levels* *num-freq-bands-levels* *num-freq-bands-levels*)
                       :initial-value 0.0)
```

```
;                      (make-array (list *num-freq-bands-levels* *num-freq-bands-levels*
;                                        *num-freq-bands-levels* *num-freq-bands-levels*)
                                   :initial-value 0.0)
                       ))

(setq *final-condition-array*
          (list
            (make-array *num-freq-bands-levels* :initial-value 0.0)
            (make-array (list *num-freq-bands-levels* *num-freq-bands-levels*)
                        :initial-value 0.0)
            (make-array (list *num-freq-bands-levels* *num-freq-bands-levels* *num-freq-bands-levels*)
                        :initial-value 0.0)
;           (make-array (list *num-freq-bands-levels* *num-freq-bands-levels*
;                             *num-freq-bands-levels* *num-freq-bands-levels*)
;                       :initial-value 0.0)
            ))

(setq *state-transition-array*
          (list
            (make-array (list *num-freq-bands-levels* *num-freq-bands-levels*)
                        :initial-value 0.0)
            (make-array (list *num-freq-bands-levels* *num-freq-bands-levels* *num-freq-bands-levels*)
                        :initial-value 0.0)
            (make-array (list *num-freq-bands-levels* *num-freq-bands-levels*
                              *num-freq-bands-levels* *num-freq-bands-levels*)
                        :initial-value 0.0)
;           (make-array (list *num-freq-bands-levels* *num-freq-bands-levels* *num-freq-bands-levels*
;                             *num-freq-bands-levels* *num-freq-bands-levels*)
;                       :initial-value 0.0)
            ))

(loop for speaker in *tdit-june-88-speaker-training-72-speaker-list-sorted-by-alternating-male-female*
          for adc-file-list = (get-training-sentences-for-speaker-id speaker)
          for log-mean-freq-bands = (fourth (get-speaker-to-array-value speaker))
          do
      (loop for adc-file in adc-file-list
            for waveform           = (read-waveform-from-adc-file adc-file :temp-array-p T)
            for freq-bands-list    = (freq-band-from-waveform-array waveform)
            for freq-bands-array   = (second freq-bands-list)
            do
        (increment-freq-band-arrays freq-bands-array log-mean-freq-bands freq-band-codebook)
        ))

(setq output (list *inital-condition-array* *final-condition-array* *state-transition-array*))

(if save-in-file (sys:dump-forms-to-file "otis:>hmm>v1>progs>freq-bands-transition-array-order-123-list.bin"
                                             (list '(setq hmm:*temp-data-parameter-list* ',output))
                                             '(:package "hmm")))
    output
    ))

(defvar *FREQ-BANDS-ARRAY-of-arrays* (make-array 10000))

(defun INCREMENT-freq-band-ARRAYS (normalized-freq-bands-array freq-band-means codebook)

(let* ((num-frames (array-dimension-n 1 normalized-freq-bands-array))
         ia fa sa norm-quant-energy-array
         (normalized-freq-bands-array-of-arrays (map-multi-d-array-to-array-of-arrays
                                                  normalized-freq-bands-array
                                                  :temp-header-array *freq-bands-array-of-arrays*))
         )
    (loop for frame from 0 below num-frames
          for freq-band = (aref normalized-freq-bands-array-of-arrays frame)
          do
      (array-subtract freq-band freq-band-means freq-band))
    ;;
    ;; quantize the energy for this sentence
    ;;
    (setq norm-quant-energy-array
          (fps-vector-quantize-vector-array normalized-freq-bands-array-of-arrays
                                            codebook
                                            :number-vectors  num-frames
                                            :number-codewords (array-length codebook)
                                            ))

;; process first order
    ;;
    (setq ia (nth 0 *inital-condition-array*))
    (setq fa (nth 0 *final-condition-array*))
    (setq sa (nth 0 *state-transition-array*))
    (loop for frame-index from 1 below num-frames
          for frame-index-1 from 0
          for te-index   = (aref norm-quant-energy-array frame-index)
          for te-index-1 = (aref norm-quant-energy-array frame-index-1)
          do
      (incf (aref sa te-index-1 te-index)))
    (incf (aref ia (aref norm-quant-energy-array 0)))
    (incf (aref fa (aref norm-quant-energy-array (- num-frames 1))))
```

```lisp
;; process 2nd order
;;
(setq ia (nth 1 *inital-condition-array*))
(setq fa (nth 1 *final-condition-array*))
(setq sa (nth 1 *state-transition-array*))
(loop for frame-index from 2 below num-frames
      for frame-index-1 from 1
      for frame-index-2 from 0
      for te-index   = (aref norm-quant-energy-array frame-index)
      for te-index-1 = (aref norm-quant-energy-array frame-index-1)
      for te-index-2 = (aref norm-quant-energy-array frame-index-2)
      do
  (incf (aref sa te-index-2 te-index-1 te-index)))
(incf (aref ia (aref norm-quant-energy-array 0) (aref norm-quant-energy-array 1)))
(incf (aref fa
             (aref norm-quant-energy-array (- num-frames 2))

(aref norm-quant-energy-array (- num-frames 1))))

;; process 3rd order
   ;;
   (setq ia (nth 2 *inital-condition-array*))
   (setq fa (nth 2 *final-condition-array*))
   (setq sa (nth 2 *state-transition-array*))
   (loop for frame-index from 3 below num-frames
         for frame-index-1 from 2
         for frame-index-2 from 1
         for frame-index-3 from 0
         for te-index   = (aref norm-quant-energy-array frame-index)
         for te-index-1 = (aref norm-quant-energy-array frame-index-1)
         for te-index-2 = (aref norm-quant-energy-array frame-index-2)
         for te-index-3 = (aref norm-quant-energy-array frame-index-3)
         do
     (incf (aref sa te-index-3 te-index-2 te-index-1 te-index)))
   (incf (aref ia
                (aref norm-quant-energy-array 0)
                (aref norm-quant-energy-array 1)
                (aref norm-quant-energy-array 2)
                ))
   (incf (aref fa
                (aref norm-quant-energy-array (- num-frames 3))
                (aref norm-quant-energy-array (- num-frames 2))
                (aref norm-quant-energy-array (- num-frames 1))
                ))

;; process 4th order
   ;;
   (setq ia (nth 3 *inital-condition-array*))
   (setq fa (nth 3 *final-condition-array*))
   (setq sa (nth 3 *state-transition-array*))
   (loop for frame-index from 4 below num-frames
         for frame-index-1 from 3
         for frame-index-2 from 2
         for frame-index-3 from 1
         for frame-index-4 from 0
         for te-index   = (aref norm-quant-energy-array frame-index)
         for te-index-1 = (aref norm-quant-energy-array frame-index-1)
         for te-index-2 = (aref norm-quant-energy-array frame-index-2)
         for te-index-3 = (aref norm-quant-energy-array frame-index-3)
         for te-index-4 = (aref norm-quant-energy-array frame-index-4)
         do
     (incf (aref sa te-index-4 te-index-3 te-index-2 te-index-1 te-index)))
   (incf (aref ia
                (aref norm-quant-energy-array 0)
                (aref norm-quant-energy-array 1)
                (aref norm-quant-energy-array 2)
                (aref norm-quant-energy-array 3)
                ))
   (incf (aref fa
                (aref norm-quant-energy-array (- num-frames 4))
                (aref norm-quant-energy-array (- num-frames 3))
                (aref norm-quant-energy-array (- num-frames 2))
                (aref norm-quant-energy-array (- num-frames 1))
                ))
   ))

(defun LOAD-AND-INITIALIZE-STATE-TRANSITION-ARRAYS (&optional (order-number *current-model-order-number*))
  (let* (temp)

;; old file was
    (load "otis:>hmm>v1>progs>freq-bands-transition-array-order-123-list.bin")

(setq *inital-condition-array* (nth (- order-number 1) (first  hmm:*temp-data-parameter-list*)))
    (setq *final-condition-array*  (nth (- order-number 1) (second hmm:*temp-data-parameter-list*)))
    (setq *state-transition-array* (nth (- order-number 1) (third  hmm:*temp-data-parameter-list*)))
```

```
#|
(cond ((= order-number 1)
       (array-normalize-sum *inital-condition-array* *inital-condition-array*)
       (array-normalize-sum *final-condition-array* *final-condition-array*)
       (loop for index from 0 below *num-freq-bands-levels*
             do
          (setq temp 0.0)
          (loop for end-index from 0 below *num-freq-bands-levels*
                do
             (incf temp (aref *state-transition-array* index end-index)))
          (cond ((> temp 0.0)
                 (loop for end-index from 0 below *num-freq-bands-levels*
                       for current-value = (aref *state-transition-array* index end-index)
                       do
                    (setf (aref *state-transition-array* index end-index)
                          (// current-value temp))))))
       )
      ((= order-number 2)
       (setq temp (make-array (* *num-freq-bands-levels* *num-freq-bands-levels*)
                              :displaced-to *inital-condition-array*))
       (array-normalize-sum temp temp)

(setq temp (make-array (* *num-freq-bands-levels* *num-freq-bands-levels*)
                              :displaced-to *final-condition-array*))
       (array-normalize-sum temp temp)
       (loop for index from 0 below *num-freq-bands-levels*
             do
         (loop for index+1 from 0 below *num-freq-bands-levels*
               do
           (setq temp 0.0)
           (loop for end-index from 0 below *num-freq-bands-levels*
                 do
             (incf temp (aref *state-transition-array* index index+1 end-index)))
           (cond ((> temp 0.0)
                  (loop for end-index from 0 below *num-freq-bands-levels*
                        for current-value = (aref *state-transition-array* index index+1 end-index)
                        do
                    (setf (aref *state-transition-array* index index+1 end-index)
                          (// current-value temp)))))))
       )
      ((= order-number 3)
       (setq temp (make-array (* *num-freq-bands-levels* *num-freq-bands-levels* *num-freq-bands-levels*)
                              :displaced-to *inital-condition-array*))
       (array-normalize-sum temp temp)
       (setq temp (make-array (* *num-freq-bands-levels* *num-freq-bands-levels* *num-freq-bands-levels*)
                              :displaced-to *final-condition-array*))
       (array-normalize-sum temp temp)
       (loop for index from 0 below *num-freq-bands-levels*
             do
         (loop for index+1 from 0 below *num-freq-bands-levels*
               do
           (loop for index+2 from 0 below *num-freq-bands-levels*
                 do
             (setq temp 0.0)
             (loop for end-index from 0 below *num-freq-bands-levels*
                   do
               (incf temp (aref *state-transition-array* index index+1 index+2 end-index)))
             (cond ((> temp 0.0)
                    (loop for end-index from 0 below *num-freq-bands-levels*
                          for current-value = (aref *state-transition-array* index index+1 index+2 end-index)
                          do
                      (setf (aref *state-transition-array* index index+1 index+2 end-index)
                            (// current-value temp)))))))))
       )
      ((= order-number 4)
       (setq temp (make-array (* *num-freq-bands-levels* *num-freq-bands-levels*
                                 *num-freq-bands-levels* *num-freq-bands-levels*)
                              :displaced-to *inital-condition-array*))
       (array-normalize-sum temp temp)
       (setq temp (make-array (* *num-freq-bands-levels* *num-freq-bands-levels*
                                 *num-freq-bands-levels* *num-freq-bands-levels*)
                              :displaced-to *final-condition-array*))
       (array-normalize-sum temp temp)
       (loop for index from 0 below *num-freq-bands-levels*
             do
         (loop for index+1 from 0 below *num-freq-bands-levels*
               do
           (loop for index+2 from 0 below *num-freq-bands-levels*
                 do
             (loop for index+3 from 0 below *num-freq-bands-levels*
                   do
               (setq temp 0.0)
               (loop for end-index from 0 below *num-freq-bands-levels*
                     do
                 (incf temp (aref *state-transition-array* index index+1 index+2 index+3 end-index)))
               (cond ((> temp 0.0)
                      (loop for end-index from 0 below *num-freq-bands-levels*
                            for current-value = (aref *state-transition-array* index index+1 index+2 index+3 end-index)
                            do
                        (setf (aref *state-transition-array* index index+1 index+2 index+3 end-index)
                              (// current-value temp))))))))))
      )
```

```lisp
            (T
              (break "only works for order 1-4"))
            )

)#
       ))

(load-and-initialize-state-transition-arrays *current-model-order-number*)

;; xxxxxxxxxxxxxxxxxxxxxxxxxxxxxxxxxxxxxxxxxxxxxxxxxxxxxxxxxxxxx
;; xxxxxxxxxxxxxxxxxxxxxxxxxxxxxxxxxxxxxxxxxxxxxxxxxxxxxxxxxxxxx
;;
;; Run the forward backward algorithm to determine the probability of being in
;; state i at time t
;;
;; xxxxxxxxxxxxxxxxxxxxxxxxxxxxxxxxxxxxxxxxxxxxxxxxxxxxxxxxxxxxx
;; xxxxxxxxxxxxxxxxxxxxxxxxxxxxxxxxxxxxxxxxxxxxxxxxxxxxxxxxxxxxx ;;
;; see file otis:>hmm>new-fb-training.lisp
;; for example of how fb-algorithm works
;;

;; xxxxxxxxxxxxxxxxxxxxxxxxxxxxxxxxxxxxxxxxxxxxxxxxxxxxxxxxxxxxx
;; xxxxxxxxxxxxxxxxxxxxxxxxxxxxxxxxxxxxxxxxxxxxxxxxxxxxxxxxxxxxx
;;
;; variable declaration and initialization
;;
;; xxxxxxxxxxxxxxxxxxxxxxxxxxxxxxxxxxxxxxxxxxxxxxxxxxxxxxxxxxxxx
;; xxxxxxxxxxxxxxxxxxxxxxxxxxxxxxxxxxxxxxxxxxxxxxxxxxxxxxxxxxxxx ;; maximum sentence number of frames
(defvar *max-num-frames* 900)

;; number of states: 32 for first order
;;
(defvar *max-num-states*)

;; this corresponds to the structure of the HMM, and uses the probabilities trained
;; on the training data.
;; these arrays are initialized in the function (INITIALIZE-FB-GLOBAL-ARRAYS-FOR-MODEL)
;;
(defvar *fb-predecessor-index-list*)
(defvar *fb-successor-index-list*)
(defvar *fb-forward-probability-list*)
(defvar *fb-backward-probability-list*)

;; the initial probabilities
(defvar *initial-probability-array*)

;; the final probabilities
(defvar *final-probability-array*)

;; of length *max-num-states*; contains list of 4 indexes
(defvar *state-index-to-list-array*)

;; multidimensional array to state index array
(defvar *state-multidimensional-index-to-state-1d-index-array*)

;; of length *max-num-states*, contains number of last index: corresponding to current state
(defvar *fb-states-last-index-array*)

;; of length *num-freq-bands-levels*, list of state indexes corresponding to this current energy level
(defvar *fb-last-index-to-state-index-array*)

(defun INITIALIZE-FB-GLOBAL-ARRAYS-FOR-FIRST-ORDER-MODEL ()
  (let* ((active-state-array (make-array (list *num-freq-bands-levels*)
                                         :initial-value NIL))
         (total-number-states 0)
         (rel-index 0)
         temp total-initial-count total-final-count
         )

(setq temp (make-array (fixr (expt *num-freq-bands-levels* 1)) :displaced-to *inital-condition-array*))
    (setq total-initial-count (float (array-sum temp)))

(setq temp (make-array (fixr (expt *num-freq-bands-levels* 1)) :displaced-to *final-condition-array*))
    (setq total-final-count (float (array-sum temp)))

;;
    ;; compute which states are used
    ;;
```

```
         (loop for i1 from 0 below *num-freq-bands-levels* do
            (if (or (> (aref *inital-condition-array* i1) 0.0)
                    (> (aref *final-condition-array* i1) 0.0))
                (setf (aref active-state-array i1) T))
            (loop for i2 from 0 below *num-freq-bands-levels* do
               (cond ((> (aref *state-transition-array* i1 i2) 0.0)
                      (setf (aref active-state-array i1) T)
                      (setf (aref active-state-array i2) T)
                      ))))
    ;;
    ;; count the total number of states
    ;;
    (loop for i1 from 0 below *num-freq-bands-levels* do
       (if (aref active-state-array i1)
           (incf total-number-states)))

(setq *max-num-states* total-number-states)
    (setq *state-index-to-list-array*        (make-array *max-num-states*))
    (setq *fb-predecessor-index-list*        (make-array *max-num-states* :initial-value NIL))
    (setq *fb-successor-index-list*          (make-array *max-num-states* :initial-value NIL))
    (setq *fb-forward-probability-list*      (make-array *max-num-states* :initial-value NIL))
    (setq *fb-backward-probability-list*     (make-array *max-num-states* :initial-value NIL))
    (setq *initial-probability-array*        (make-array *max-num-states*))
    (setq *final-probability-array*          (make-array *max-num-states*))
    (setq *fb-states-last-index-array*       (make-array *max-num-states*))
    (setq *fb-last-index-to-state-index-array* (make-array *max-num-states*))
    (setq *state-multidimensional-index-to-state-1d-index-array* (make-array *num-freq-bands-levels* :initial-value NIL))
        active-state-array)
    ;;
    ;; compute the index of each state
    ;;
    (loop for i1 from 0 below *num-freq-bands-levels* do
       (cond ((aref active-state-array i1)
              (setf (aref *state-index-to-list-array* rel-index)
                    (list i1))
              (setf (aref active-state-array i1) rel-index)
              (incf rel-index))))

;;
    ;; compute the transition arrays
    ;;
    (loop for i from 0 below *max-num-states*
          for index-list = (aref *state-index-to-list-array* i)
          for i1 = (first index-list)
          do (setf (aref *initial-probability-array* i)
             (// (aref *inital-condition-array* i1)
                 total-initial-count))

(setf (aref *final-probability-array* i)
             (// (aref *final-condition-array* i1)
                 total-final-count))

(setf (aref *fb-states-last-index-array* i) i1)
       (push i (aref *fb-last-index-to-state-index-array* i1))

(setq temp 0.0)
       (loop for i2 from 0 below *num-freq-bands-levels*
             do
          (incf temp (aref *state-transition-array* i1 i2)))
       (cond ((> temp 0.0)
              (loop for i2 from 0 below *num-freq-bands-levels*
                    for trans-prob = (// (aref *state-transition-array* i1 i2) temp)
                    for succ-state-index = (aref *state-multidimensional-index-to-state-1d-index-array* i2)
                    for pred-state-index = i
                    do
                 (cond ((> trans-prob 0.0)
                        (push succ-state-index (aref *fb-successor-index-list*    pred-state-index))
                        (push trans-prob       (aref *fb-forward-probability-list* pred-state-index))

(push pred-state-index (aref *fb-predecessor-index-list*  succ-state-index))
                        (push trans-prob       (aref *fb-backward-probability-list* succ-state-index))
                        )))))))

(defun INITIALIZE-FB-GLOBAL-ARRAYS-FOR-SECOND-ORDER-MODEL ()
   (let* ((active-state-array (make-array (list *num-freq-bands-levels* *num-freq-bands-levels*)
                                          :initial-value NIL))
          (total-number-states 0)
          (rel-index 0)
          temp total-initial-count total-final-count
          )

(setq temp (make-array (fixr (expt *num-freq-bands-levels* 2)) :displaced-to *inital-condition-array*))
      (setq total-initial-count (float (array-sum temp)))

(setq temp (make-array (fixr (expt *num-freq-bands-levels* 2)) :displaced-to *final-condition-array*))
      (setq total-final-count (float (array-sum temp)))

;;
      ;; compute which states are used
      ;;
```

```
(loop for i1 from 0 below *num-freq-bands-levels* do
  (loop for i2 from 0 below *num-freq-bands-levels* do
    (if (or (> (aref *inital-condition-array* i1 i2) 0.0)
            (> (aref *final-condition-array* i1 i2) 0.0))
        (setf (aref active-state-array i1 i2) T))
    (loop for i3 from 0 below *num-freq-bands-levels* do
      (cond ((> (aref *state-transition-array* i1 i2 i3) 0.0)
             (setf (aref active-state-array i1 i2) T)
             (setf (aref active-state-array i2 i3) T)
             )))))
;;
;; count the total number of states
;;
(loop for i1 from 0 below *num-freq-bands-levels* do
  (loop for i2 from 0 below *num-freq-bands-levels* do
    (if (aref active-state-array i1 i2)
        (incf total-number-states))))

(setq *max-num-states* total-number-states)
(setq *state-index-to-list-array*       (make-array *max-num-states*))
(setq *fb-predecessor-index-list*       (make-array *max-num-states* :initial-value NIL))
(setq *fb-successor-index-list*         (make-array *max-num-states* :initial-value NIL))
(setq *fb-forward-probability-list*     (make-array *max-num-states* :initial-value NIL))
(setq *fb-backward-probability-list*    (make-array *max-num-states* :initial-value NIL))
(setq *initial-probability-array*       (make-array *max-num-states*))
(setq *final-probability-array*         (make-array *max-num-states*))
(setq *fb-states-last-index-array*      (make-array *max-num-states*))
(setq *fb-last-index-to-state-index-array* (make-array *num-freq-bands-levels* :initial-value NIL))
(setq *state-multidimensional-index-to-state-1d-index-array* active-state-array)

;;
;; compute the index of each state
;;
(loop for i1 from 0 below *num-freq-bands-levels* do
  (loop for i2 from 0 below *num-freq-bands-levels* do
    (cond ((aref active-state-array i1 i2)
           (setf (aref *state-index-to-list-array* rel-index)
                 (list i1 i2))
           (setf (aref active-state-array i1 i2) rel-index)
           (incf rel-index)))))

;;
;; compute the transition arrays
;;
(loop for i from 0 below *max-num-states*
      for index-list = (aref *state-index-to-list-array* i)
      for i1 = (first index-list)
      for i2 = (second index-list)
      do (setf (aref *initial-probability-array* i)
        (// (aref *inital-condition-array* i1 i2)
            total-initial-count))

(setf (aref *final-probability-array* i)
        (// (aref *final-condition-array* i1 i2)
            total-final-count))

(setf (aref *fb-states-last-index-array* i) i2)
  (push i (aref *fb-last-index-to-state-index-array* i2))

(setq temp 0.0)
  (loop for i3 from 0 below *num-freq-bands-levels*
        do
    (incf temp (aref *state-transition-array* i1 i2 i3)))
  (cond ((> temp 0.0)
         (loop for i3 from 0 below *num-freq-bands-levels*
               for trans-prob = (// (aref *state-transition-array* i1 i2 i3) temp)
               for succ-state-index = (aref *state-multidimensional-index-to-state-1d-index-array* i2 i3)
               for pred-state-index = i
               do
           (cond ((> trans-prob 0.0)
                  (push succ-state-index (aref *fb-successor-index-list*    pred-state-index))
                  (push trans-prob       (aref *fb-forward-probability-list* pred-state-index))

(push pred-state-index (aref *fb-predecessor-index-list*   succ-state-index))
                  (push trans-prob       (aref *fb-backward-probability-list* succ-state-index))
                  ))))
  ))

(defun INITIALIZE-FB-GLOBAL-ARRAYS-FOR-THIRD-ORDER-MODEL ()
  (let* ((active-state-array (make-array (list *num-freq-bands-levels* *num-freq-bands-levels*
                                                *num-freq-bands-levels*)
                                          :initial-value NIL))
         (total-number-states 0)
         (rel-index 0)
         temp total-initial-count total-final-count
         )

(setq temp (make-array (fixr (expt *num-freq-bands-levels* 3)) :displaced-to *inital-condition-array*))
    (setq total-initial-count (float (array-sum temp)))
```

```
(setq temp (make-array (fixr (expt *num-freq-bands-levels* 3)) :displaced-to *final-condition-array*))
(setq total-final-count (float (array-sum temp)))

;;
;; compute which states are used
;;
(loop for i1 from 0 below *num-freq-bands-levels* do
  (loop for i2 from 0 below *num-freq-bands-levels* do
    (loop for i3 from 0 below *num-freq-bands-levels* do
      (if (or (> (aref *inital-condition-array* i1 i2 i3) 0.0)
              (> (aref *final-condition-array*  i1 i2 i3) 0.0))
          (setf (aref active-state-array i1 i2 i3) T))
      (loop for i4 from 0 below *num-freq-bands-levels* do
        (cond ((> (aref *state-transition-array* i1 i2 i3 i4) 0.0)
               (setf (aref active-state-array i1 i2 i3) T)
               (setf (aref active-state-array i2 i3 i4) T)
               ))))))
;;
;; count the total number of states
;;
(loop for i1 from 0 below *num-freq-bands-levels* do
  (loop for i2 from 0 below *num-freq-bands-levels* do
    (loop for i3 from 0 below *num-freq-bands-levels* do
      (if (aref active-state-array i1 i2 i3)
          (incf total-number-states)))))

(setq *max-num-states* total-number-states)
(setq *state-index-to-list-array*      (make-array *max-num-states*))
(setq *fb-predecessor-index-list*      (make-array *max-num-states* :initial-value NIL))
(setq *fb-successor-index-list*        (make-array *max-num-states* :initial-value NIL))
(setq *fb-forward-probability-list*    (make-array *max-num-states* :initial-value NIL))
(setq *fb-backward-probability-list*   (make-array *max-num-states* :initial-value NIL))
(setq *initial-probability-array*      (make-array *max-num-states*))
(setq *final-probability-array*        (make-array *max-num-states*))
(setq *fb-states-last-index-array*     (make-array *max-num-states*))
(setq *fb-last-index-to-state-index-array* (make-array *num-freq-bands-levels* :initial-value NIL))
(setq *state-multidimensional-index-to-state-1d-index-array* active-state-array)

;;
;; compute the index of each state
;;
(loop for i1 from 0 below *num-freq-bands-levels* do
  (loop for i2 from 0 below *num-freq-bands-levels* do
    (loop for i3 from 0 below *num-freq-bands-levels* do
      (cond ((aref active-state-array i1 i2 i3)
             (setf (aref *state-index-to-list-array* rel-index)
                   (list i1 i2 i3))
             (setf (aref active-state-array i1 i2 i3) rel-index)
             (incf rel-index))))))

;;
;; compute the transition arrays
;;
(loop for i from 0 below *max-num-states*
      for index-list = (aref *state-index-to-list-array* i)
      for i1 = (first  index-list)
      for i2 = (second index-list)
      for i3 = (third  index-list)
      do (setf (aref *initial-probability-array* i)
        (// (aref *inital-condition-array* i1 i2 i3)
            total-initial-count))

(setf (aref *final-probability-array* i)
        (// (aref *final-condition-array*  i1 i2 i3)
            total-final-count))

(setf (aref *fb-states-last-index-array* i) i3)
  (push i (aref *fb-last-index-to-state-index-array* i3))

(setq temp 0.0)
  (loop for i4 from 0 below *num-freq-bands-levels*
        do
    (incf temp (aref *state-transition-array* i1 i2 i3 i4)))
  (cond ((> temp 0.0)

(loop for i4 from 0 below *num-freq-bands-levels*
               for trans-prob = (// (aref *state-transition-array* i1 i2 i3 i4) temp)
               for succ-state-index = (aref *state-multidimensional-index-to-state-1d-index-array* i2 i3 i4)
               for pred-state-index = i
               do
           (cond ((> trans-prob 0.0)
                  (push succ-state-index (aref *fb-successor-index-list*      pred-state-index))
                  (push trans-prob       (aref *fb-forward-probability-list*  pred-state-index))

(push pred-state-index (aref *fb-predecessor-index-list*    succ-state-index))
                  (push trans-prob       (aref *fb-backward-probability-list* succ-state-index))
                  ))))))
))
```

```lisp
(defun INITIALIZE-FB-GLOBAL-ARRAYS-FOR-FOURTH-ORDER-MODEL ()
  (let* ((active-state-array (make-array (list *num-freq-bands-levels* *num-freq-bands-levels*
                                                *num-freq-bands-levels* *num-freq-bands-levels*)
                                          :initial-value NIL))
         (total-number-states 0)
         (rel-index 0)
         temp total-initial-count total-final-count
         )

(setq temp (make-array (fixr (expt *num-freq-bands-levels* 4)) :displaced-to *inital-condition-array*))
    (setq total-initial-count (float (array-sum temp)))

(setq temp (make-array (fixr (expt *num-freq-bands-levels* 4)) :displaced-to *final-condition-array*))
    (setq total-final-count (float (array-sum temp)))

;;
    ;; compute which states are used
    ;;
    (loop for i1 from 0 below *num-freq-bands-levels* do
      (loop for i2 from 0 below *num-freq-bands-levels* do
        (loop for i3 from 0 below *num-freq-bands-levels* do
          (loop for i4 from 0 below *num-freq-bands-levels* do
            (if (or (> (aref *inital-condition-array* i1 i2 i3 i4) 0.0)
                    (> (aref *final-condition-array* i1 i2 i3 i4) 0.0))
                (setf (aref active-state-array i1 i2 i3 i4) T))
            (loop for i5 from 0 below *num-freq-bands-levels* do
              (cond ((> (aref *state-transition-array* i1 i2 i3 i4 i5) 0.0)
                     (setf (aref active-state-array i1 i2 i3 i4) T)
                     (setf (aref active-state-array i2 i3 i4 i5) T)
                     )))))))
    ;;
    ;; count the total number of states
    ;;
    (loop for i1 from 0 below *num-freq-bands-levels* do
      (loop for i2 from 0 below *num-freq-bands-levels* do
        (loop for i3 from 0 below *num-freq-bands-levels* do
          (loop for i4 from 0 below *num-freq-bands-levels* do
            (if (aref active-state-array i1 i2 i3 i4)
                (incf total-number-states))))))

(setq *max-num-states* total-number-states)
    (setq *state-index-to-list-array*        (make-array *max-num-states*))
    (setq *fb-predecessor-index-list*        (make-array *max-num-states* :initial-value NIL))
    (setq *fb-successor-index-list*          (make-array *max-num-states* :initial-value NIL))
    (setq *fb-forward-probability-list*      (make-array *max-num-states* :initial-value NIL))
    (setq *fb-backward-probability-list*     (make-array *max-num-states* :initial-value NIL))
    (setq *initial-probability-array*        (make-array *max-num-states*))
    (setq *final-probability-array*          (make-array *max-num-states*))
    (setq *fb-states-last-index-array*       (make-array *max-num-states*))
    (setq *fb-last-index-to-state-index-array* (make-array *num-freq-bands-levels* :initial-value NIL))
    (setq *state-multidimensional-index-to-state-1d-index-array* active-state-array)

;;
    ;; compute the index of each state
    ;;
    (loop for i1 from 0 below *num-freq-bands-levels* do
      (loop for i2 from 0 below *num-freq-bands-levels* do
        (loop for i3 from 0 below *num-freq-bands-levels* do
          (loop for i4 from 0 below *num-freq-bands-levels* do
            (cond ((aref active-state-array i1 i2 i3 i4)
                   (setf (aref *state-index-to-list-array* rel-index)
                         (list i1 i2 i3 i4))
                   (setf (aref active-state-array i1 i2 i3 i4) rel-index)
                   (incf rel-index)))))))

;;
    ;; compute the transition arrays
    ;;
    (loop for i from 0 below *max-num-states*
          for index-list = (aref *state-index-to-list-array* i)
          for i1 = (first  index-list)
          for i2 = (second index-list)
          for i3 = (third  index-list)
          for i4 = (fourth index-list)
          do (setf (aref *initial-probability-array* i)
            (// (aref *inital-condition-array* i1 i2 i3 i4)
                total-initial-count))

(setf (aref *final-probability-array* i)
            (// (aref *final-condition-array* i1 i2 i3 i4)
                total-final-count))

(setf (aref *fb-states-last-index-array* i) i4)
      (push i (aref *fb-last-index-to-state-index-array* i4))

(setq temp 0.0)
      (loop for i5 from 0 below *num-freq-bands-levels*
            do
        (incf temp (aref *state-transition-array* i1 i2 i3 i4 i5)))
```

```
        (cond ((> temp 0.0)
              (loop for i5 from 0 below *num-freq-bands-levels*
                    for trans-prob = (// (aref *state-transition-array* i1 i2 i3 i4 i5) temp)
                    for succ-state-index = (aref *state-multidimensional-index-to-state-1d-index-array* i2 i3 i4 i5)
                    for pred-state-index = i
                    do
                (cond ((> trans-prob 0.0)
                       (push succ-state-index (aref *fb-successor-index-list*     pred-state-index))
                       (push trans-prob       (aref *fb-forward-probability-list* pred-state-index))

(push pred-state-index (aref *fb-predecessor-index-list*   succ-state-index))
                       (push trans-prob       (aref *fb-backward-probability-list* succ-state-index))
                       ))))))
     ))

(cond ((= 1 *current-model-order-number*)
       (INITIALIZE-FB-GLOBAL-ARRAYS-FOR-FIRST-ORDER-MODEL))
      ((= 2 *current-model-order-number*)
       (INITIALIZE-FB-GLOBAL-ARRAYS-FOR-SECOND-ORDER-MODEL))
      ((= 3 *current-model-order-number*)
       (INITIALIZE-FB-GLOBAL-ARRAYS-FOR-THIRD-ORDER-MODEL))
      ((= 4 *current-model-order-number*)
       (INITIALIZE-FB-GLOBAL-ARRAYS-FOR-FOURTH-ORDER-MODEL))
      )

(defun INITIALIZE-FB-GLOBAL-ARRAYS-FOR-MODEL ()
  (let* ((num-states *max-num-states*))

;;
    ;; clear the global pointer arrays
    ;;
    (loop for i from 0 below num-states
          do
      (setf (aref *fb-predecessor-index-list*    i) NIL)
      (setf (aref *fb-successor-index-list*      i) NIL)
      (setf (aref *fb-forward-probability-list*  i) NIL)
      (setf (aref *fb-backward-probability-list* i) NIL)
      )

(loop for index-0 from 0 below *num-freq-bands-levels*
          do
      (loop for index-1 from 0 below *num-freq-bands-levels*
            for state-index = (+ (* index-0 *num-freq-bands-levels*) index-1)
            do
        (loop for index-2 from 0 below *num-freq-bands-levels*
              for succ-prob = (aref *state-transition-array* index-0 index-1 index-2)
              for succ-state-index = (+ (* index-1 *num-freq-bands-levels*) index-2)
              do
          (cond ((> succ-prob 0.0)
                 (push succ-state-index (aref *fb-successor-index-list*      state-index))
                 (push succ-prob        (aref *fb-forward-probability-list*  state-index))

(push state-index      (aref *fb-predecessor-index-list*    succ-state-index))
                 (push succ-prob        (aref *fb-backward-probability-list* succ-state-index))
                 )))))))

;; (INITIALIZE-FB-GLOBAL-ARRAYS-FOR-MODEL)

;; forward array: alpha
(defvar *fb-forward-array-of-arrays*     (make-array *max-num-frames*))

;; backward array: beta. used as backtrace array in the viterbi version
(defvar *fb-backward-array-of-arrays*    (make-array *max-num-frames*))

;; probability for state at time: gamma
(defvar *fb-bw-prob-bin-arrays*          (make-array *max-num-frames*))

;; prob for observed noisy given states p(E'(t)|En(t))
(defvar *prob-noisy-freq-band-given-state-array-of-arrays* (make-array *max-num-frames*))

;;prob freq-band bin given the noisy freq-band sequence {E'}
;;This is the result of summing the gamma array over all previous states
(defvar *prob-freq-band-bin-given-noisy-freq-band-sequence-array-of-arrays* (make-array *max-num-frames*))

;; the scaling for the alpha array
(defvar *fb-scale-array*                 (make-array *max-num-frames*))

(defun INITIALIZE-FB-GLOBAL-ARRAYS ()
  (let* ()
    (loop for i from 0 below *max-num-frames*
          do
```

```lisp
            ;; output distributions
            (setf (aref *prob-noisy-freq-band-given-state-array-of-arrays* i) (make-array *max-num-states*))
            ;; forward probabilities
            (setf (aref *fb-forward-array-of-arrays*   i) (make-array *max-num-states*))
            ;; backward probabilities
            (setf (aref *fb-backward-array-of-arrays*  i) (make-array *max-num-states*))
            ;; baum-welch (gamma) probabilities
            (setf (aref *fb-bw-prob-bin-arrays*        i) (make-array *max-num-states*))
            ;;
            (setf (aref *prob-freq-band-bin-given-noisy-freq-band-sequence-array-of-arrays* i)
                  (make-array *num-freq-bands-levels*))
            )))

(INITIALIZE-FB-GLOBAL-ARRAYS)

;;use the freq-bands table and normalize the integral of p(E'|n) over E' to 1
;;
;(defun make-table-integrals-for-prob-noisy-freq-bands-given-clean-bin
;    (&key
;     (prob-bin-given-noisy-table *freq-band-vq-probability-estimation-table*)
;     (save-table-in-file        T)
;     )
;  (let* ((output NIL)
;         (prob-bin-given-noisy-table-array (second prob-bin-given-noisy-table))
;         (table-3d-array (make-array (list (array-dimension-n 1 prob-bin-given-noisy-table-array)
;                                           (array-dimension-n 2 prob-bin-given-noisy-table-array)
;                                           (array-dimension-n 3 prob-bin-given-noisy-table-array))
;                          :displaced-to (copy-array prob-bin-given-noisy-table-array)))
;         (temp-array (make-array (array-dimension-n 3 table-3d-array)))
;         )
;    (loop for i from 0 below (array-dimension-n 1 table-3d-array)
;          do
;      (loop for j from 0 below (array-dimension-n 2 table-3d-array)
;            do
;        (loop for k from 0 below (array-dimension-n 3 table-3d-array)
;              do
;          (setf (aref temp-array k) (aref table-3d-array i j k))
;          )
;        (array-normalize-sum temp-array temp-array)

;        (loop for k from 0 below (array-dimension-n 3 table-3d-array)
;              do
;          (setf (aref table-3d-array i j k) (aref temp-array k))
;          )
;        )
;      )

;    (setq output (list (first prob-bin-given-noisy-table)
;                       table-3d-array
;                       (third prob-bin-given-noisy-table)))

;    (if save-table-in-file (sys:dump-forms-to-file "ruby:>adoram>prob-noisy-given-clean-bin-table-freq-bands.bin"
;                                                   (list '(setq hmm:*prob-noisy-given-clean-bin-table-freq-bands* ',output))
;                                                   '(:package "hmm")))
;    output))

;; ***********************************************************
;; ***********************************************************
;;
;; run time processing
;;
;; ***********************************************************
;; ***********************************************************

;; fill the array *prob-noisy-freq-band-given-state-array-of-arrays* with
;; p(E'|En)
(defun initialize-fb-freq-band-probability-arrays (output-array signal-to-noise)
  (let* ((num-frames       (array-length output-array))
         (num-freq-band-levels *num-freq-bands-levels*)
         )
    (loop for frame-index from 0 below num-frames
          for probability-array = (aref *prob-noisy-freq-band-given-state-array-of-arrays* frame-index)
          for output = (aref output-array frame-index)
          do
      (loop for freq-band-level from 0 below num-freq-band-levels
            for output-probability = (probability-noisy-freq-bands-given-clean-bin output freq-band-level signal-to-noise)
            do
        (loop for state-index in (aref *fb-last-index-to-state-index-array* freq-band-level)
              do
          (setf (aref probability-array state-index) output-probability)
          )))))

(defun probability-noisy-freq-bands-given-clean-bin (freq-band bin signal-to-noise-array
                                                     &key
                                                     (estimation-table *freq-band-vq-probability-estimation-table*)
                                                     (temp-table-noisy-entries *temp-estimation-table-noisy-entries*)
                                                     )
  (without-floating-underflow-traps
    (loop for filter from 0 below (array-length freq-band)
          with product = 1
          for noisy = (aref freq-band filter)
          for prob-x-given-n = (get-prob-x-given-n-from-estimation-table
                                 filter (aref signal-to-noise-array filter)
                                 (aref freq-band filter)
```

```
                              :table (aref (second estimation-table) bin)
                              :initialization (if (zerop bin) T NIL)
                              :noisy-table-entries temp-table-noisy-entries
                              )
            finally (return product)
            do
         (setq product (* product prob-x-given-n))
         )
    ))

(defun compute-forward-backward-freq-band-arrays (output-array signal-to-noise
                                                     &key
                                                     (error-output-file "otis:>hmm>hmm-errors.text")
                                                     )
     (let* ((num-frames          (array-length output-array))
            (scale-constant      1.0)
            (num-freq-band-levels *num-freq-bands-levels*)
            (num-states          *max-num-states*)
            (initial-probs       *initial-probability-array*)
            (prob-threshold      (// 0.1 *num-freq-bands-levels*))
            )
       (initialize-fb-freq-band-probability-arrays output-array signal-to-noise)

(without-floating-underflow-traps

;; do this so floating overflow errors don't blow us away totally
         (when
           (condition-case (error-condition)
             (progn
               ;; the following two outer loops computes the forward and backward probs for the
               ;; particular output sequence "output" given the current probability estimates
               ;; compute forward probabilities -- see eqn (1) page 1039

;;
               ;; compute forward probabilities
               ;;
               (loop for time from 0 below num-frames
                     for probability-array = (aref *prob-noisy-freq-band-given-state-array-of-arrays* time)
                     for forward-array = (aref *fb-forward-array-of-arrays* time)
                     for previous-forward-array first nil then (aref *fb-forward-array-of-arrays* (1- time))
                     do (loop for state-index from 0 below num-states
                        do
                    (setf (aref forward-array state-index)
                          (if (= 0 time)
                              (* (aref initial-probs state-index)
                                 (aref probability-array state-index))
                              (* (loop for predecessor-index in (aref *fb-predecessor-index-list* state-index)
                                       for predecessor-prob in (aref *fb-backward-probability-list* state-index)
                                       sum (* (aref previous-forward-array predecessor-index) predecessor-prob))
                                 (aref probability-array state-index))
                              )))

;;
   ;; compute scaling constant
   ;;
   (let ((k1 (loop for state-index from 0 below num-states
                   sum (aref forward-array state-index))))
     (if (not (= k1 0))
         (setf (aref *fb-scale-array* time) (// k1 scale-constant))
         (setf (aref *fb-scale-array* time) 1.0)))

;;
   ;; scale the forward probability array
   ;;
   (loop for state-index from 0 below num-states
         for scale-it = (// 1.0 (aref *fb-scale-array* time))
         do
     (setf (aref forward-array state-index)
           (* (aref forward-array state-index) scale-it))
   ))

;;
   ;; compute backward probabilities
   ;;
   (loop for time from (1- num-frames) downto 0
         for next-probability-frame first nil then (aref *prob-noisy-freq-band-given-state-array-of-arrays* (1+ time))
         for scale-it = (// 1.0 (aref *fb-scale-array* time))
         for last-frame-p first T then NIL
         for backward-array = (aref *fb-backward-array-of-arrays* time)
         for next-backward-array first nil then (aref *fb-backward-array-of-arrays* (1+ time))
         do
     (loop for state-index from 0 below num-states
           do
       (setf (aref backward-array state-index)
             (* scale-it
                (if last-frame-p
                    (aref *final-probability-array* state-index)
                    (loop for next-state-index in (aref *fb-successor-index-list* state-index)
                          for transition-prob in (aref *fb-forward-probability-list* state-index)
                          sum (* transition-prob
                                 (aref next-probability-frame next-state-index)
                                 (aref next-backward-array next-state-index)
                                 ))))))
```

```
;; now that the forward and backward probabilities are calculated, we add up
;; their contributions to the reestimation equations
;; now to help reestimate the next parameters we take the contribution of the current "output"
;; to the general reestimation equations
;; the arrays num-aij, denom-aij, num-bij, denom-bij, are used and the initial state probs are
;; not reestimated. See eqns (69) and (70) page 1056

(setq log-probability-of-output
          (loop for i from 0 below num-frames
                sum (log (aref *fb-scale-array* i))))
    )
;; the error print message really should go to some special file so that I don't miss it
;; also should print out what utterance this is
;; really want to :use-double on these errors automatically, but how??
(sys:floating-exponent-overflow
  (write-string-to-stamped-file
    error-output-file
    (format nil "WARNING: file , ERROR: -a-%" error-condition))
  nil)
(:no-error t)))

;;compute gamma
(loop for time from 0 below num-frames
      for forward-array = (aref *fb-forward-array-of-arrays* time)
      for backward-array = (aref *fb-backward-array-of-arrays* time)
      for gamma-array = (aref *fb-bw-prob-bin-arrays* time)
      for te-bin-output-probability-array = (aref *prob-freq-band-bin-given-noisy-freq-band-sequence-array-of-arrays* time)
      do
  (loop for i from 0 below num-states do
    (setf (aref gamma-array i) (* (aref forward-array i)(aref backward-array i)))
    )
  (array-normalize-sum gamma-array gamma-array)

;;sum over previous frames to get probability of freq-band levels for current frame (loop for level from 0 below num-freq-band-levels
        for prob-bin = (loop for state-index in (aref *fb-last-index-to-state-index-array* level)
                             sum (aref gamma-array state-index)
                             )
        for truncated-prob-bin = (if (> prob-bin prob-threshold) prob-bin 0.0)
        do
    (setf (aref te-bin-output-probability-array level) truncated-prob-bin)
    )
  (array-normalize-sum te-bin-output-probability-array te-bin-output-probability-array)
  )
)

*prob-freq-band-bin-given-noisy-freq-band-sequence-array-of-arrays*
)

(defun spectral-estimation-freq-band-forward-backward-for-tdit
       (noise-total-energy
        freq-band-means
        freq-band-2d-array
        filterbank-means
        log-filter-energy-2d-array
        &key
        (mean-noise-filterbank-energy     *mean-noise-filter-log-energy-array*)
        (signal-to-noise-in-filterbank    *temp-signal-to-noise-array*)
        (mean-noise-freq-band-energy      *mean-noise-log-freq-band-array*)
        (signal-to-noise-in-freq-band     *temp-freq-band-signal-to-noise-array*)
        (filterbank-estimation-table      *estimation-table-by-freq-band*)
        (freq-band-estimation-table       *freq-band-vq-probability-estimation-table*)
        (filter-log-energy-for-0-db-noise-array
          *filter-log-energy-for-0-db-white-noise-array*)
        (freq-band-log-energy-for-0-db-noise-array
          *freq-band-log-energy-for-0-db-white-noise-array*)
        )
  (array-constant-add filter-log-energy-for-0-db-noise-array noise-total-energy mean-noise-filterbank-energy)
  (array-constant-add freq-band-log-energy-for-0-db-noise-array noise-total-energy mean-noise-freq-band-energy)

(spectral-estimation-freq-band-forward-backward freq-band-means freq-band-2d-array
                                                   filterbank-means log-filter-energy-2d-array
                                                   :mean-noise-filterbank-energy mean-noise-filterbank-energy
                                                   :mean-noise-freq-band-energy mean-noise-freq-band-energy
                                                   :signal-to-noise-in-filterbank signal-to-noise-in-filterbank
                                                   :signal-to-noise-in-freq-band signal-to-noise-in-freq-band
                                                   :filterbank-estimation-table filterbank-estimation-table
                                                   :freq-band-estimation-table freq-band-estimation-table
                                                   )
  )

(defun spectral-estimation-freq-band-forward-backward
       (freq-band-means freq-band-2d-array
        filterbank-means log-filter-energy-2d-array
        &key
        (mean-noise-filterbank-energy     *mean-noise-filter-log-energy-array*)
        (mean-noise-freq-band-energy      *mean-noise-log-freq-band-array*)
        (signal-to-noise-in-filterbank    *temp-signal-to-noise-array*)
        (signal-to-noise-in-freq-band     *temp-freq-band-signal-to-noise-array*)
        (filterbank-estimation-table      *estimation-table-by-freq-band*)
        (freq-band-estimation-table       *freq-band-vq-probability-estimation-table*)
        )
```

```lisp
    (let* ((freq-bands-array-of-arrays (map-multi-d-array-to-array-of-arrays
                                        freq-band-2d-array
                                        :temp-header-array *freq-bands-array-of-arrays*))
           )

(array-subtract filterbank-means mean-noise-filterbank-energy signal-to-noise-in-filterbank)
      (array-subtract freq-band-means mean-noise-freq-band-energy signal-to-noise-in-freq-band)

(translate-filterbank-snr-to-table-snr-entries signal-to-noise-in-filterbank signal-to-noise-in-filterbank
                                                    filterbank-estimation-table)
      (translate-filterbank-snr-to-table-snr-entries signal-to-noise-in-freq-band signal-to-noise-in-freq-band
                                                    (second freq-band-estimation-table))

;;normalize freq-band-array
      ;;
      (loop for frame-number from 0 below (array-dimension-n 1 log-filter-energy-2d-array)
            for freq-band = (aref freq-bands-array-of-arrays frame-number)
            do
            (array-subtract freq-band mean-noise-freq-band-energy freq-band)
            )

(loop for frame-number from 0 below (array-dimension-n 1 log-filter-energy-2d-array)
            with probability-bin-array-of-arrays =
                 (compute-forward-backward-freq-band-arrays freq-bands-array-of-arrays signal-to-noise-in-freq-band)
            for filterbank = (map-2d-to-1d-array log-filter-energy-2d-array frame-number)
            do
            (array-subtract filterbank mean-noise-filterbank-energy filterbank)
            (estimate-filterbank-by-freq-band-vq-for-frame NIL filterbank
                                :freq-band-signal-to-noise NIL
                                :signal-to-noise-in-filterbank signal-to-noise-in-filterbank
                                :filterbank-estimation-table filterbank-estimation-table
                                :freq-band-estimation-table NIL
                                :freq-band-probability-array (aref probability-bin-array-of-arrays
                                                                  frame-number)
                                )
            (array-add filterbank mean-noise-filterbank-energy filterbank)
            )
      ))

;(defun test-estimation-of-freq-bands (speaker
;                                      &key
;                                      (signal-to-noise-ratio 10)
;                                      (use-forward-backward T)
;                                      )
;  (reset-gaussian-random-number-generator-seed)
;  (let* ((adc-file (first (sort (zl-user:recursive-list-files
;                                 (format nil "ruby:>database>-A>-A>-A-*-st*.adc.newest" 'tdie speaker 'tdie)) #'string< )))
;         (filterbank-average-list (get-speaker-to-array-value speaker))
;         (noise-power-in-db (- (first filterbank-average-list) signal-to-noise-ratio))
;         (waveform (read-waveform-from-adc-file adc-file :temp-array-p T))
;         (clean-freq-bands-array (second (total-log-freq-band-from-waveform-array waveform :create-new-filterbank-array T)))
;         (noisy-waveform (add-gaussian-random-noise-to-speech-waveform waveform
;                                                                      (db-to-power noise-power-in-db)
;                                                                      :known-power T
;                                                                      :temp-array-p T))
;         (noisy-freq-bands-array (second (total-log-freq-band-from-waveform-array noisy-waveform :create-new-filterbank-array T)))
;         (estimated-freq-bands-array
;          (expected-freq-bands-array-from-aposteriori-prob noisy-freq-bands-array noise-power-in-db signal-to-noise-ratio
;                                                          :use-forward-backward use-forward-backward))
;         )
;    (list clean-freq-bands-array noisy-freq-bands-array estimated-freq-bands-array)
;    ))

;(defun expected-freq-bands-array-from-aposteriori-prob (freq-bands-array noise-power-in-db signal-to-noise
;                                                        &key (use-forward-backward T)
;                                                        )
;  (array-constant-subtract freq-bands-array (+ noise-power-in-db *mean-freq-bands-for-0-db-white-noise*)
;                           freq-bands-array)

;  (let* ((estimated-freq-bands-array (copy-array freq-bands-array))
;         (probability-bin-array-of-arrays (if use-forward-backward
;                                              (compute-forward-backward-arrays freq-bands-array signal-to-noise)))
;         )
;    (loop for frame-number from 0 below (array-length freq-bands-array)
;          for probability-freq-bands-bin-array =
;              (if use-forward-backward
;                  (aref probability-bin-array-of-arrays frame-number)
;                  (get-probability-for-freq-bands-bin
;                   (aref freq-bands-array frame-number)
;                   signal-to-noise
;                   (aref *prob-freq-band-bin-given-noisy-freq-band-sequence-array-of-arrays* frame-number))
;                  )
;          for estimated-freq-bands = (expected-freq-bands-from-aposteriori-prob probability-freq-bands-bin-array)
;          do
;          (setf (aref estimated-freq-bands-array frame-number) estimated-freq-bands)
;          )

;    (array-constant-add freq-bands-array (+ noise-power-in-db *mean-freq-bands-for-0-db-white-noise*)
;                        freq-bands-array)
```

```
;     (array-constant-add estimated-freq-bands-array
;                         (+ noise-power-in-db signal-to-noise *mean-freq-bands-for-0-db-white-noise*)
;                         estimated-freq-bands-array)
;     ))
;
;(defun expected-freq-bands-from-aposteriori-prob (probability-freq-bands-bin-array
;                                                  &key
;                                                  (lowest-centroid -52)
;                                                  (bin-size        6)
;                                                  )
;   (loop for bin from 0 below (array-length probability-freq-bands-bin-array)
;         for centroid from lowest-centroid by bin-size
;         sum (* centroid (aref probability-freq-bands-bin-array bin))
;         ))
```
at (0 0 cc)
window (0 0 0)
imagesize (0 0)
imagespace (0 0 0 0)
pagereversal on
prerasterization off
language impress
inputbin PLAIN
paper LETTER
copies 1
jobheader on
papermismatch hold
jamresistance on System Version TURBO UltraScript 4.1T Rev. B IP/II, Serial #86:9:39
Page images processed: 5
Pages printed: 5

Paper size (width, height):
  2560, 3328
Document length:
  27865 bytes

```
;;; ************************************************************
;;;                The DECIPHER Speech Recognition System
;;;
;;;  Unpublished-rights reserved under the copyright laws of the United States.
;;;
;;;  This data and information is proprietary to, and a valuable trade
;;;  secret of, SRI International.  It is given in confidence by SRI
;;;  International.  Its use, duplication, or disclosure is subject to the
;;;  restrictions set forth in the License Agreement under which it has
;;;  been distributed.
;;;
;;; ************************************************************
;;;
;;;             Unpublished Copyright (c) 1990, SRI International
;;;
;;; ************************************************************
;;;-*- Mode: LISP; Package: HMM; Syntax: Zetalisp; Base: 10.;  -*-

(load "ruby:>adoram>estimation-auxiliaries.bin")
(load "otis:>hmm>v1>progs>fps-filterbank")

(load "ruby:>adoram>probability-noisy-filterbank-given-clean.bin")

(defvar *filterbank-pdfs-sorted-by-vq-fb*)
(load "ruby:>adoram>filterbank-pdfs-spk-norm-sorted-by-32-vq.bin")

(defvar *temp-frames-array* (make-array 5000))
(defvar *temp-conditioned-probability-bin-array* (make-array 256))

(defvar *temp-estimation-table-noisy-entries* (make-array (list *num-mel-filters* 4)))

(defvar *estimation-table-filterbank-vq*)

(defvar *temp-integral-k-n-array-of-arrays* (make-array *num-mel-filters*))
(loop for k from 0 below *num-mel-filters* do
  (setf (aref *temp-integral-k-n-array-of-arrays* k)(make-array (array-length (first *estimation-table-filterbank-vq*)))
  )

(defun get-filterbank-pdf-sorted-by-vq
       (&key
        (num-speakers 72)
        (hist-base    -70)
        (bin-size     1)
        (num-bins     100)
```

```
                (codebook         (read-codebook "ruby:>adoram>codebook-filterbank-spk-norm-32.bin"))
                (results-filename "ruby:>adoram>filterbank-pdfs-72-spk-norm-sorted-by-32-vq.bin")
                (num-filters *num-mel-filters*)
                )

(let* ((array-of-histograms (make-array (list (array-length codebook) num-filters)))
         output vq-index-array
         )
    (loop for vq-index from 0 below (array-length codebook) do
      (loop for filter-index from 0 below num-filters do
        (setf (aref array-of-histograms vq-index filter-index)(array-clear (make-array num-bins)))
      ))
    (loop for speaker from 0 below num-speakers
          for speaker-id = (nth speaker *tdit-june-88-speaker-training-72-speaker-list-sorted-by-alternating-male-female*)
          for adc-file-list = (get-training-sentences-for-speaker-number speaker)
          for filterbank-averages = (second (get-speaker-to-array-value speaker-id))
          do (loop for adc-file in adc-file-list
            for waveform = (read-waveform-from-adc-file adc-file :temp-array-p T)
            for filterbank-list = (filterbank-from-waveform-array waveform :create-new-filterbank-array NIL)
            for filterbank-2d-array = (seventh filterbank-list)
            for filterbank-array-of-arrays =
                (map-multi-d-array-to-array-of-arrays filterbank-2d-array :temp-header-array *temp-frames-array*)
            do
        (loop for frame from 0 below (fourth filterbank-list)
              for filterbank = (aref filterbank-array-of-arrays frame)
              do
          (array-subtract filterbank filterbank-averages filterbank)
          )
        (setq vq-index-array (fps-vector-quantize-vector-array filterbank-array-of-arrays codebook))

(loop for frame from 0 below (fourth filterbank-list)
              for filterbank = (aref filterbank-array-of-arrays frame)
              for vq-index = (aref vq-index-array frame)
              do
          (loop for filter-index from 0 below (array-length filterbank)
                for filter-log-energy = (aref filterbank filter-index)
                for quantized-filter-log-energy = (linear-quantization filter-log-energy hist-base bin-size num-bins)
                do (incf (aref (aref array-of-histograms vq-index filter-index) quantized-filter-log-energy))
            ))

)
      )
    (setq output (list hist-base bin-size array-of-histograms))
    (if (stringp results-filename)

(sys:dump-forms-to-file results-filename
                              (list '(setq hmm:*filterbank-pdfs-sorted-by-vq-fb* ',output))
                              '(:package "hmm")))
    output))

(defun compute-filterbank-vq-estimation-table
    (&key
     (filterbank-pdfs          *filterbank-pdfs-sorted-by-vq-fb*)
     (min-signal-to-noise-list
       '(9. 11. 16. 18. 19. 17. 15. 11. 9. 9. 9. 9. 8. 6. 4. 1. -1. -4. -4. -6. -3. -6. -7. -8. -10.))
     (delta-signal-to-noise     1)
     (num-signal-to-noise-entries 17)
     (min-noisy                -10)
     (delta-noisy              1)
     (num-noisy-energy-entries 25)
     (num-filters              *num-mel-filters*)
     (table-filename           "ruby:>adoram>estimation-table-filterbank-vq-spk-norm-32-for-10db-white.bin")
     (cond-probability-table   *conditioned-probability-table*)
     )
  (without-floating-underflow-traps (let* ((output NIL)
           (histogram-arrays (third filterbank-pdfs))
           (histogram-base (first filterbank-pdfs))
           (histogram-bin-size (second filterbank-pdfs))
           (num-mixtures (array-dimension-n 1 histogram-arrays))
           (c (make-array num-mixtures))
           (sn-hat-array (make-array num-mixtures))
           (prob-xn-array (make-array num-mixtures))
           (cond-probability-array (third cond-probability-table))
           (table-entry-parameters (list min-signal-to-noise-list delta-signal-to-noise num-signal-to-noise-entries
                                         min-noisy delta-noisy num-noisy-energy-entries))
           )
      ;;create table arrays
      ;;
      (loop for mixture from 0 below num-mixtures do
        (setf (aref sn-hat-array mixture)
              (list table-entry-parameters (make-array (list num-filters num-signal-to-noise-entries num-noisy-energy-entries))))
        (setf (aref prob-xn-array mixture)
              (list table-entry-parameters (make-array (list num-filters num-signal-to-noise-entries num-noisy-energy-entries))))
        )
      ;;normalize the histograms and get norm-coefficients
      ;;
```

```
       (loop for mixture from 0 below num-mixtures
             for sum = (array-sum (aref histogram-arrays mixture 0))
             do
         (setf (aref c mixture) sum)
         (loop for filter from 0 below num-filters
               for histogram = (aref histogram-arrays mixture filter)
               do
           (array-constant-divide histogram sum histogram)))
       (array-normalize-sum c c)

;; start table computation
       (loop for filter-index from 0 below num-filters
             for min-signal-to-noise in min-signal-to-noise-list
             do
         (loop for signal-to-noise-index from 0 below num-signal-to-noise-entries
               for signal-to-noise from min-signal-to-noise by delta-signal-to-noise
               for clean-bin-offset =
                   (if (listp cond-probability-table)
                       (fixr (- (+ histogram-base signal-to-noise) (first cond-probability-table))))
               do
           (loop for noisy-index from 0 below num-noisy-energy-entries
                 for normalized-noisy-log-energy from min-noisy by delta-noisy
                 do (loop for mixture from 0 below num-mixtures
                   for clean-filter-energy-hist = (aref histogram-arrays mixture filter-index)
                   do (cl:multiple-value-bind (sn-hat prob-xn)

(loop for clean-speech-index from 0 below (array-length clean-filter-energy-hist)
                       for clean-speech = (+ (* clean-speech-index histogram-bin-size) histogram-base signal-to-noise)
                       for prob-clean = (aref clean-filter-energy-hist clean-speech-index)
                       for cond-probability-bin = (max 0 (+ clean-speech-index clean-bin-offset))
                       for conditioned-prob = (if (plusp prob-clean)
                                                  (aref cond-probability-array
                                                        filter-index noisy-index cond-probability-bin)
                                                  0)
                       for prob-product = (* conditioned-prob prob-clean)
                       sum prob-product into prob-xn
                       sum (* prob-product clean-speech) into sn-hat
                       finally (return (values (if (plusp prob-xn) (// sn-hat prob-xn) normalized-noisy-log-energy)
                                               prob-xn))
                       )
                 (setf (aref (second (aref sn-hat-array mixture)) filter-index signal-to-noise-index noisy-index)
                       sn-hat)
                 (setf (aref (second (aref prob-xn-array mixture)) filter-index signal-to-noise-index noisy-index)
                       prob-xn)

(setq output (list c sn-hat-array prob-xn-array))
       (if (stringp table-filename)
           (sys:dump-forms-to-file table-filename
                                   (list '(setq *estimation-table-filterbank-vq* ,output))
                                   '(:package "hmm"))
           )
       output)))

(defun spectral-estimation-filterbank-vq
       (noise-power
        filterbank-means
        log-filter-energy-2d-array
        num-frames
        &key
        (estimation-table                   *estimation-table-filterbank-vq*)
        (temp-signal-to-noise-in-filterbank *temp-signal-to-noise-array*)
        (temp-mean-noise-filter-energy      *temp-mean-filterbank-array*)
        (from-frame                         0)
        )
  (let* ((noise-power-in-db (power-to-db noise-power))
         )

;; compute means of speech and noise energies over waveform
    ;;
    (loop for filter-index from 0 below *num-mel-filters*
          for mean-speech-filter-log-energy = (aref filterbank-means filter-index)
          for mean-noise-filter-log-energy = (+ (nth filter-index *filter-log-energy-for-0-db-white-noise*) noise-power-in-db)
          for signal-to-noise = (- mean-speech-filter-log-energy mean-noise-filter-log-energy)
          do (setf (aref temp-signal-to-noise-in-filterbank filter-index) signal-to-noise)
      (setf (aref temp-mean-noise-filter-energy filter-index) mean-noise-filter-log-energy)
      )
    (translate-filterbank-snr-to-table-snr-entries temp-signal-to-noise-in-filterbank temp-signal-to-noise-in-filterbank
                                                  (second estimation-table))
    ;; estimate individual frames, all filters simultaneously using VQ (loop for frame-number from from-frame below num-frames
          for filterbank = (map-2d-to-1d-array log-filter-energy-2d-array frame-number)
          do (array-subtract filterbank temp-mean-noise-filter-energy filterbank)

(spectral-estimation-filterbank-vq-for-frame
        filterbank
        :signal-to-noise-array temp-signal-to-noise-in-filterbank
        :estimation-table estimation-table)
```

```
           (array-add filterbank temp-mean-noise-filter-energy filterbank)
         )
       log-filter-energy-2d-array))

(defun spectral-estimation-filterbank-vq-for-frame
          (noisy-filterbank
            &key
            (estimation-table         *estimation-table-filterbank-vq*)
            (temp-table-noisy-entries *temp-estimation-table-noisy-entries*)
            (signal-to-noise-array    *temp-signal-to-noise-array*)
            (temp-cond-prob-bin-array *temp-conditioned-probability-bin-array*)
            (compute-prob-bin         T)
            )

(without-floating-underflow-traps
       (let* ((cond-prob-bin-array (if compute-prob-bin
                                       (filterbank-vq-prob-n-given-x noisy-filterbank
                                                     :estimation-table estimation-table
                                                     :temp-table-noisy-entries temp-table-noisy-entries
                                                     :signal-to-noise-array signal-to-noise-array
                                                     :cond-prob-bin-array temp-cond-prob-bin-array)
                                       temp-cond-prob-bin-array))
              (num-mixtures (array-length cond-prob-bin-array))
              )

(loop for filter from 0 below *num-mel-filters* do
           (setf (aref noisy-filterbank filter)
                 (loop for mixture from 0 below num-mixtures
                       with weighted-estimate = 0.0
                       for cond-prob-bin = (aref cond-prob-bin-array mixture)
                       finally (return weighted-estimate)
                       do
                   (if (plusp cond-prob-bin)
                       (incf weighted-estimate (* cond-prob-bin (get-estimate-from-vq-estimation-table
                                                                 filter (aref signal-to-noise-array filter)
                                                                 (aref noisy-filterbank filter)
                                                                 :table (aref (second estimation-table) mixture)
                                                                 :initialization (if (not compute-prob-bin) T NIL)
                                                                 :noisy-table-entries temp-table-noisy-entries
                                                                 )
                                              )))
                       )))
         )
       ))
     noisy-filterbank)))

(defun filterbank-vq-prob-n-given-x (noisy-filterbank
                                        &key
                                        (estimation-table         *estimation-table-filterbank-vq*)
                                        (cond-prob-bin-array      *temp-conditioned-probability-bin-array*)
                                        (integral-k-n             *temp-integral-k-n-array-of-arrays*)
                                        (temp-table-noisy-entries *temp-estimation-table-noisy-entries*)
                                        (signal-to-noise-array    *temp-signal-to-noise-array*)
                                        )
     (without-floating-underflow-traps
       (let* ((prob-mixtures (first estimation-table))
              (num-mixtures (array-length prob-mixtures))
              (cond-prob-bin-array (make-array num-mixtures :displaced-to cond-prob-bin-array))
              (pruning-threshold (// 0.1 (float num-mixtures)))
              max-n
              )

(loop for filter from 0 below *num-mel-filters*
               for integral-n = (aref integral-k-n filter)
               do
           (loop for mixture from 0 below num-mixtures do
             (setf (aref integral-n mixture) (fast-get-prob-x-given-n-from-estimation-table
                                               filter (aref signal-to-noise-array filter)
                                               (aref noisy-filterbank filter)
                                               :table (aref (third estimation-table) mixture)
                                               :initialization (if (zerop mixture) T NIL)
                                               :noisy-table-entries temp-table-noisy-entries
                                               )
                   ))
           (setq max-n (array-maximum integral-n))
           (if (plusp max-n)(array-constant-divide integral-n max-n integral-n)
               (loop for mixture from 0 below num-mixtures do (incf (aref integral-n mixture))))
               )

(loop for mixture from 0 below num-mixtures
               for prob-x-vector-given-n = (loop for filter from 0 below *num-mel-filters*
                                                 with product = 1
                                                 finally (return product)
                                                 do (setq product
                                                          (* product (aref (aref integral-k-n filter) mixture)))
```

```
            do (setf (aref cond-prob-bin-array mixture) (* (aref prob-mixtures mixture) prob-x-vector-given-n))
            )

(array-normalize-sum cond-prob-bin-array cond-prob-bin-array)

(loop for bin from 0 below num-mixtures
            do (if (< (aref cond-prob-bin-array bin) pruning-threshold)(setf (aref cond-prob-bin-array bin) 0.0))
            )
        (array-normalize-sum cond-prob-bin-array cond-prob-bin-array)

cond-prob-bin-array)))

(defun fast-get-prob-x-given-n-from-estimation-table (filter-index
                                                      signal-to-noise-index
                                                      noisy-log-filter-energy
                                                      &key
                                                      (table           NIL)
                                                      (initialization  T)
                                                      (noisy-table-entries *temp-estimation-table-noisy-entries*)
                                                      )
    (let* ((table-array (second table))
           (table-entry-parameters (first table))
           (num-noisy (sixth table-entry-parameters))
           norm-noisy low-noisy-index
           )
        (cond (initialization
               (setq norm-noisy (max 0 (- noisy-log-filter-energy (fourth table-entry-parameters))))
               (setq low-noisy-index (max 0 (fix norm-noisy)))
               (setf (aref noisy-table-entries filter-index 0) low-noisy-index)
               (setf (aref noisy-table-entries filter-index 2) norm-noisy)
               )
              (T
               (setq low-noisy-index (aref noisy-table-entries filter-index 0))
               (setq norm-noisy (aref noisy-table-entries filter-index 2))
               )
              )
        (if (< (1+ low-noisy-index) num-noisy)

(+ (aref table-array filter-index signal-to-noise-index low-noisy-index)
               (* (- (aref table-array filter-index signal-to-noise-index (1+ low-noisy-index))
                     (aref table-array filter-index signal-to-noise-index low-noisy-index))
                  (- norm-noisy low-noisy-index)))
            0)
        ))

(defun get-estimate-from-vq-estimation-table (filter-index
                                              signal-to-noise-index
                                              noisy-log-filter-energy
                                              &key
                                              (table           NIL)
                                              (initialization  T)
                                              (noisy-table-entries *temp-estimation-table-noisy-entries*)
                                              )
    (let* ((table-array (second table))
           (table-entry-parameters (first table))
           (num-noisy (sixth table-entry-parameters))
           norm-noisy low-noisy-index
           )
        (cond (initialization
               (setq norm-noisy (max 0 (- noisy-log-filter-energy (fourth table-entry-parameters))))
               (setq low-noisy-index (max 0 (fix norm-noisy)))
               (setf (aref noisy-table-entries filter-index 0) low-noisy-index)
               (setf (aref noisy-table-entries filter-index 2) norm-noisy)
               )
              (T
               (setq low-noisy-index (aref noisy-table-entries filter-index 0))
               (setq norm-noisy (aref noisy-table-entries filter-index 2))
               )
              )
        (if (< (1+ low-noisy-index) num-noisy)
            (+ (aref table-array filter-index signal-to-noise-index low-noisy-index)
               (* (- (aref table-array filter-index signal-to-noise-index (1+ low-noisy-index))
                     (aref table-array filter-index signal-to-noise-index low-noisy-index))
                  (- norm-noisy low-noisy-index)))
            noisy-log-filter-energy)
        ))

#|
(progn
    (setq *filterbank-pdfs-sorted-by-vq-fb* (get-filterbank-pdf-sorted-by-vq))
    (setq *estimation-table-filterbank-vq* (compute-filterbank-vq-estimation-table))
    )
|#

(+ (aref table-array filter-index signal-to-noise-index low-noisy-index)
               (* (- (aref table-array filter-index signal-to-noise-index (1+ low-noisy-index))
                     (aref table-array filter-index signal-to-noise-index low-noisy-index))
                  (- norm-noisy low-noisy-index)))
            0)
        ))
```

```
(defun get-estimate-from-vq-estimation-table (filter-index
                                              signal-to-noise-index
                                              noisy-log-filter-energy
                                              &key
                                              (table           NIL)
                                              (initialization  T)
                                              (noisy-table-entries *temp-estimation-table-noisy-entries*)
                                              )
  (let* ((table-array (second table))
         (table-entry-parameters (first table))
         (num-noisy (sixth table-entry-parameters))
         norm-noisy low-noisy-index
         )
    (cond (initialization
           (setq norm-noisy (max 0 (- noisy-log-filter-energy (fourth table-entry-parameters))))
           (setq low-noisy-index (max 0 (fix norm-noisy)))
           (setf (aref noisy-table-entries filter-index 0) low-noisy-index)
           (setf (aref noisy-table-entries filter-index 2) norm-noisy)
           )
          (T
           (setq low-noisy-index (aref noisy-table-entries filter-index 0))
           (setq norm-noisy (aref noisy-table-entries filter-index 2))
           )
          )
    (if (< (1+ low-noisy-index) num-noisy)
        (+ (aref table-array filter-index signal-to-noise-index low-noisy-index)
           (* (- (aref table-array filter-index signal-to-noise-index (1+ low-noisy-index))
                 (aref table-array filter-index signal-to-noise-index low-noisy-index))
              (- norm-noisy low-noisy-index)))
        noisy-log-filter-energy)
    ))

#|
(progn
  (setq *filterbank-pdfs-sorted-by-vq-fb* (get-filterbank-pdf-sorted-by-vq))
  (setq *estimation-table-filterbank-vq* (compute-filterbank-vq-estimation-table))
  )
|#
```

We claim:

1. In a speech recognition system for responding to signals representative of digitized speech, a method for preprocessing a noisy speech signal to estimate a clean speech signal, comprising the steps of:

categorizing each time-invariant segment of digitized speech and noise into a noisy speech vector, each element of said noisy speech vector representing one frequency channel of speech information in the presence of noise, said noise being assumed to be additive, time invariant and uncorrelated to the frequency domain;

estimating a clean speech signal comprising a clean speech vector for each said element from said noisy speech vector by (1) determining the probability distribution of clean speech by applying the noisy speech vector to a mixture model composed of a mixture of components, each component representing a different speech class assuming different frequency channels are uncorrelated within each class, (2) modelling the conditional probability function of a vector of noisy speech around a vector of clean speech as uncorrelated at different frequency channels; and storing the estimated clean speech signal in memory.

2. The method according to claim 1 wherein said estimating step comprises:

estimating filter log spectral energies on a multiple-frequency channel probability according to the function:

$$S_k = \sum_{n=1}^{N} S_k|n \cdot P(n|S')$$

where index n is a class and where the estimate of $S_k$ around n is the $n^{th}$ class-conditioned MMSE estimator given by:

$$S_k|n = \frac{1}{P(S'_k|n)} \int S_k P(S'_k|S_k) P_n(S_k) dS_k$$

where $$P(S'_k|n) = \int P(S'_k|S_k) P_n(S_k) dS_k.$$

3. The method according to claim 2 wherein said estimating step comprises applying a minimum mean-log-spectral-distance estimation to said vector of noisy speech to obtain an estimation of Euclidean distance.

4. The method according to claim 1 wherein said conditional probability of a noisy speech vector around a clean speech vector $P(S'_k|S_k)$ is modeled as follows:

1) noise associated with said speech to be estimated is assumed to be a stationary, autoregressive moving average stochastic process such that, at each time frame, coefficients of a discrete Fourier transform (DFT) for said noise are uncorrelated complex Gaussian random variables;

2) filter output energy is assumed to be approximated by a sum of M coefficients;

3) noise spectral power is assumed to be uniform within a range of passbands of filters;

such that, in the presence of noise alone, said summation extends over a total of 2M random variables which are Gaussian, of zero mean and of a variance:

$$\sigma^2 = (N_k)/(2M)$$

where $N_k$ is the expected value of the noise filter energy wherein variance-normalized filter energy obeys a chi-squared probability distribution (PD) with 2M degrees of freedom, and
such that, in the presence of speech and noise, filter energy is given by:

$$E_k = {}_i^\Sigma |DFT_x(i) + DFT_n(i)|^2$$

where $DFT_x$ refers to speech coefficients and $DFT_n$ refers to noise coefficients, wherein said variance-normalized filter obeys a probability distribution of noncentral chi-squared with 2M degrees of freedom and noncentral parameter $\lambda$;
in order that the conditional probability of the filter energy is given by:

$$P\left[\frac{E'_k}{N_k} \mid \frac{E_k}{N_k}\right] = 2M \cdot \chi^2_{N.C.}\left[\frac{2ME_k}{N_k}, 2M, \lambda\right]$$

where $$\lambda = \sum_i \frac{|DFT_x(i)|^2}{\sigma^2} = \frac{2ME_k}{N_k}$$

so that, with the following normalized log-energy variable defined as:

$$S_k = 10 \log_{10}\left[\frac{E_k}{N_k}\right]; \quad S'_k = 10 \log_{10}\left[\frac{E'_k}{N_k}\right],$$

the conditional probability for $S'_k$ is given by $$P = (S'_k \mid S_k) = 0.23 \frac{E'_k}{N_k} P\left[\frac{E'_k}{N_k} \mid \frac{E_k}{N_k}\right].$$

5. The method according to claim 1 wherein said mixture model is implemented as a vector quantization mixture model where classes are identified with rigid boundary partitions of the acoustic space and the partitions are created by vector quantization.

6. The method according to claim 1 wherein said mixture model is implemented as a mixture of Gaussians mixture model with the assumptions that the probabilities Pn(Sk) are Gaussian distributions and the mean and standard deviations
of these Gaussians are adjusted so as to maximize the likelihood of speech data given the mixture model.

7. The method according to claim 2 wherein the vector S' of said mixture model is replaced by a vector R', where the vector R' is a lower dimensional vector of log spectral energies in wide frequency bands and wherein the probability of class n conditioned on S' is replaced by the probability of new class n conditioned on R' such that new class n components refer to classes in a mixture model for a vector R.

8. The method according to claim 7 wherein the mixture model for vector R is implemented as a vector quantization mixture model where classes are identified with rigid boundary partitions of acoustic space and the partitions are created by vector quantization and wherein S k in the expression for the estimator for clean speech:

$$S_k = \sum_{n=1}^{N} S_k|n \cdot P(n|R')$$

is conditioned on new class n.

9. The method according to claim 7 wherein the mixture model for vector R is implemented as a mixture of Gaussians mixture model with the assumptions that the probabilities $P_n(R_j)$ are Gaussian distributions and the mean and standard deviations of these Gaussians are adjusted so as to maximize the likelihood of speech data given the mixture model and wherein $S_k$ in the expression for the estimator for clean speech:

$$S_k = \sum_{n=1}^{N} S_k|n \cdot P(n|R')$$

is conditioned on new class n.

10. In a speech recognition system for responding to signals representative of digitized speech, a method for preprocessing speech in the presence of noise to produce an estimated clean speech signal, comprising the steps of:
  providing a data base of clean speech;
  training a Markov model with said clean speech data base, each state of said Markov model representing a different speech class assuming different frequency channels are uncorrelated within each class, to produce parameters for said Markov model;
  categorizing each time-invariant segment of digitized speech and noise into a noisy speech vector, each element of said noisy speech vector representing one frequency channel of speech information in the presence of noise, said noise being assumed to be frequency independent and time invariant;
  estimating a clean speech signal comprising a clean speech vector for each vector of a sequence of said noisy speech vectors $S'_O$ to $S'_T$ by
    1) determining a probability distribution of the clean speech vector by applying the noisy speech vector to the Markov model using said parameters, and
    2) modelling a conditional probability function of a vector of noisy speech around a vector of clean speech as uncorrelated at different frequency channels.

11. The method according to claim 10 wherein said estimating step comprises:
  estimating filter log spectral energies on a multiple-frequency channel probability according to $$S_k = {}_n^\Sigma S_k|n \cdot P(n|S'_O, \ldots, S'_t \ldots S'_T)$$

where index n is a state and where the estimate of $S_k$ around n is the $n^{th}$ MMSE estimator given by:

$$S_k|n = \frac{1}{P(S'_k|n)} \int S_k\, P(S'_k|S_k)\, P_n(S_k)\, dS_k$$

where $$P(S'_k|n) = \int P(S'_k|S_k)\, P_n(S_k)\, dS_k$$

where a Hidden Markov model is assumed for the speech, and the Hidden Markov state output probabilities are specified by:

$$P(S'|n) = \prod_{k=1}^{K} P(S'_k|n).$$

and where a forward-backward algorithm is applied to compute $P(n|S'_0 \ldots, S'_t \ldots S'_T)$.

12. The method according to claim 10 wherein said conditional probability of a noisy speech vector around a clean speech vector $P(S'_k|S_k)$ is modeled as follows:
1) noise associated with said speech to be estimated is assumed to be a stationary, autoregressive moving average stochastic process such that, at each time frame, coefficients of a discrete Fourier transform (DFT) for said noise are uncorrelated complex Gaussian random variables;
2) filter output energy is assumed to be approximated by a sum of M coefficients;
3) noise spectral power is assumed to be uniform within a range of summation;

such that, in the absence of noise, said summation extends over a total of 2M random variables which are Gaussian, of zero means and of a variance:

$$\sigma^2 = (N_k)/(2M)$$

where $N_k$ is the expected value of the noise filter energy wherein variance-normalized filter energy obeys a chi-squared probability distribution (PD) with 2M degrees of freedom, and such that, in the presence of speech and noise, filter energy is given by:

$$E'_k = \sum_i |DFT_s(i) + DFT_n(i)|^2$$

where $DFT_s$ refers to speech coefficients and $DFT_n$ refers to noise coefficients, wherein said variance-normalized filter obeys a probability distribution of noncentral chi-squared with 2M degrees of freedom and noncentral parameter $\lambda p$ in order that the conditional probability of the filter energy is given by:

$$P\left[\frac{E'_k}{N_k} \mid \frac{E_k}{N_k}\right] = 2M \cdot \chi^2_{N.C.}\left[\frac{2ME'_k}{N_k}, 2M, \lambda\right]$$

where $$\lambda = \sum_i \frac{|DFT_s(i)|^2}{\sigma^2} = \frac{2ME_k}{N_k}$$

so that, with the following normalized log-energy variable defined as:

$$S_k = 10 \log_{10}\left[\frac{E_k}{N_k}\right]; \quad S'_k = 10 \log_{10}\left[\frac{E'_k}{N_k}\right],$$

the conditional probability for $S'_k$ is given by $$P = (S'_k|S_k) = 0.23 \frac{E'_k}{N_k} P\left[\frac{E'_k}{N_k} \mid \frac{E_k}{N_k}\right].$$

13. The method according to claim 10 wherein said Markov model is implemented as a vector quantization Markov model where states are identified with rigid boundary partitions of the acoustic space and the partitions are created by vector quantization.

14. The method according to claim 11 wherein the vector S' of said mixture model is replaced by a vector R', where the vector R' is a lower dimensional vector of log spectral energies in wide frequency bands and wherein the probability of state n conditioned on sequence of S'(t) where t is from zero to T is replaced by the probability of new state n conditioned on sequence of R'(t) where t is from zero to T such that new state n components refer to states in a Markov model for a vector R.

15. The method according to claim 14 wherein the mixture model for vector R is implemented as a vector quantization Markov model where states are identified with rigid boundary partitions of the acoustic space and the partitions are created by vector quantization and $S_k$ is conditioned on new state n.

* * * * *